(12) United States Patent
Jiang et al.

(10) Patent No.: US 11,943,256 B2
(45) Date of Patent: Mar. 26, 2024

(54) LINK DETECTION METHOD AND APPARATUS, ELECTRONIC DEVICE, AND STORAGE MEDIUM

(71) Applicant: Tencent Technology (Shenzhen) Company Limited, Guangdong (CN)

(72) Inventors: Jizhou Jiang, Shenzhen (CN); Qing Qin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 242 days.

(21) Appl. No.: 17/711,091

(22) Filed: Apr. 1, 2022

(65) Prior Publication Data

US 2022/0224720 A1   Jul. 14, 2022

Related U.S. Application Data

(63) Continuation of application No. PCT/CN2020/126051, filed on Nov. 3, 2020.

(30) Foreign Application Priority Data

Feb. 28, 2020 (CN) .......................... 202010131183.6

(51) Int. Cl.
*H04L 9/40* (2022.01)
*G06F 16/955* (2019.01)
*H04L 9/00* (2022.01)

(52) U.S. Cl.
CPC ...... *H04L 63/1483* (2013.01); *G06F 16/9566* (2019.01); *H04L 9/50* (2022.05)

(58) Field of Classification Search
None
See application file for complete search history.

(56) References Cited

U.S. PATENT DOCUMENTS

| | | | |
|---|---|---|---|
| 8,869,271 | B2 | 10/2014 | Jayaraman et al. |
| 10,027,702 | B1 | 7/2018 | Oliver |

(Continued)

FOREIGN PATENT DOCUMENTS

| | | |
|---|---|---|
| CN | 103618720 A | 3/2014 |
| CN | 103745156 A | 4/2014 |

(Continued)

OTHER PUBLICATIONS

International Search Report and Written Opinion dated Feb. 5, 2021 in Application No. PCT/CN2020/126051 with English Translation.

(Continued)

*Primary Examiner* — Cai Y Chen
(74) *Attorney, Agent, or Firm* — ARENTFOX SCHIFF LLP

(57) ABSTRACT

A link detection method includes obtaining first service provider information from text that includes the first service provider information and a short link to be analyzed. At least one reference short link is obtained from a second service provider based on the first service provider information. A determination regarding the security of the short link to be (Continued)

analyzed is made based on a comparison between the short link to be analyzed and the at least one reference short link obtained from the second service provider.

20 Claims, 6 Drawing Sheets

(56) References Cited

U.S. PATENT DOCUMENTS

| | | | | |
|---|---|---|---|---|
| 11,172,258 | B1 * | 11/2021 | Tamersoy | ............... G06F 18/22 |
| 2012/0047577 | A1 | 2/2012 | Costinsky | |

FOREIGN PATENT DOCUMENTS

| | | |
|---|---|---|
| CN | 104143055 A | 11/2014 |
| CN | 104486140 A | 4/2015 |
| CN | 104717185 A | 6/2015 |
| CN | 104735074 A | 6/2015 |
| CN | 104954372 A | 9/2015 |
| CN | 104994183 A | 10/2015 |
| CN | 105100119 A | 11/2015 |
| CN | 106126707 A | 11/2016 |
| CN | 107733972 A | 2/2018 |
| CN | 108810003 A | 11/2018 |
| CN | 110098979 A | 8/2019 |
| CN | 110278212 A | 9/2019 |
| CN | 111355732 A | 6/2020 |

OTHER PUBLICATIONS

Weibo Open Platform. "Upgrade Announcement: Short URL Generation Third-Party Interface" https://weibo.com/ttarticle/p/show?id=2309404201558857408545, Jan. 29, 2018, 1 page. with English Translation.

Y. Cai, "Design and Implementation of Short URLService System for Netease", China Master's Theses Full-text Database, Oct. 15, 2012, 108 pages. with English-Language abstract attached.

N. S. Gawale and N. N. Patil, "Implementation of a system to detect malicious URLs for Twitter users," 2015 International Conference on Pervasive Computing (ICPC), 2015, pp. 1-5, doi: 10.1109/PERVASIVE.2015.7087078.

N. Gupta, A. Aggarwal and P. Kumaraguru, "bit.ly/malicious: Deep dive into short URL based e-crime detection," 2014 APWG Symposium on Electronic Crime Research (eCrime), 2014, pp. 14-24, doi: 10.1109/ECRIME.2014.6963161.

Chinese Office Action dated Dec. 2, 2020 in Application No. 202010131183.6 with Concise English Translation.

Chinese Office Action dated Feb. 19, 2021 in Application No. 202010131183.6 with Concise English Translation.

* cited by examiner

LINK DETECTION METHOD AND APPARATUS, ELECTRONIC DEVICE, AND STORAGE MEDIUM

RELATED APPLICATIONS

This application is a continuation of International Application No. PCT/CN2020/126051, filed on Nov. 3, 2020, which claims priority to Chinese Patent Application No. 202010131183.6, entitled "LINK DETECTION METHOD AND APPARATUS, ELECTRONIC DEVICE, AND STORAGE MEDIUM" and filed on Feb. 28, 2020. The entire disclosures of the prior applications are hereby incorporated by reference.

FIELD OF THE TECHNOLOGY

This application relates to the field of Internet security technologies, including a link detection method and apparatus, an electronic device, and a non-transitory computer-readable storage medium.

BACKGROUND OF THE DISCLOSURE

With the development of Internet technologies, a user can browse content that interests the user on the Internet. During browsing, the user may share a link of browsed content with others to share the content with others, for example, a news link, a video link, or an application download link. However, while facilitating sharing of content, links are prone to security risks. For example, a malicious user may create a fraudulent webpage with fraudulent content and transmit a link of the fraudulent webpage to a user to implement fraud. Because the user cannot determine whether the received link is secure, determination of the security of the link is a problem that needs to be resolved.

In the related art, a user may determine the security of a received link by querying a registered source of the link. For example, when receiving a link for modifying a password of the user's social account, the user may query whether a registered source of the link is a service provider of the social account. If yes, it indicates that the link is secure, and if not, it indicates that the link is not secure.

SUMMARY

Embodiments of this disclosure provide a link detection method and apparatus, an electronic device, and a non-transitory computer-readable storage medium, which can determine the security of a to-be-detected short link. The technical solutions are as follows.

In an embodiment, a link detection method includes obtaining first service provider information from a target text, the target text including the first service provider information and a short link, and obtaining at least one reference short link based on the first service provider information, the at least one reference short link being at least one short link that is generated by a second service provider for a first service provider and meets a target condition, the first service provider being a service provider indicated by the first service provider information, the second service provider being configured to provide a short link generation service. The link detection method further includes determining, in response to a determination that the short link is not included in the obtained at least one reference short link, that the short link is insecure.

In an embodiment, a link detection apparatus includes processing circuitry configured to obtain first service provider information from a target text, the target text including a short link, and obtain at least one reference short link based on the first service provider information, the at least one reference short link being at least one short link that is generated by a second service provider for a first service provider and meets a target condition, the first service provider being a service provider indicated by the first service provider information, the second service provider being configured to provide a short link generation service. The processing circuitry is further configured to determine, in response to a determination that the short link is not included in the obtained at least one reference short link, that the short link is insecure.

In an embodiment, a non-transitory computer-readable storage medium stores computer-readable instructions thereon, which, when executed by a processor, cause the processor to perform obtaining first service provider information from a target text, the target text including a short link, and obtaining at least one reference short link based on the first service provider information, the at least one reference short link being at least one short link that is generated by a second service provider for a first service provider and meets a target condition, the first service provider being a service provider indicated by the first service provider information, the second service provider being configured to provide a short link generation service. The instructions further cause the processor to perform determining, in response to a determination that the short link is not included in the obtained at least one reference short link, that the short link is insecure.

In the embodiments of this disclosure, at least one reference short link that is generated by the second service provider for the first service provider and meets the target condition is obtained, and then the at least one reference short link is compared with the short link in the target text to determine whether the short link is a short link generated for the first service provider, so as to determine whether the short link is secure.

BRIEF DESCRIPTION OF THE DRAWINGS

To describe the technical solutions in the embodiments of this disclosure, the following briefly introduces the accompanying drawings describing the embodiments. The accompanying drawings in the following description show some embodiments of this disclosure, and a person of ordinary skill in the art may still derive other accompanying drawings from these accompanying drawings.

DESCRIPTION OF EMBODIMENTS

Figure 1:
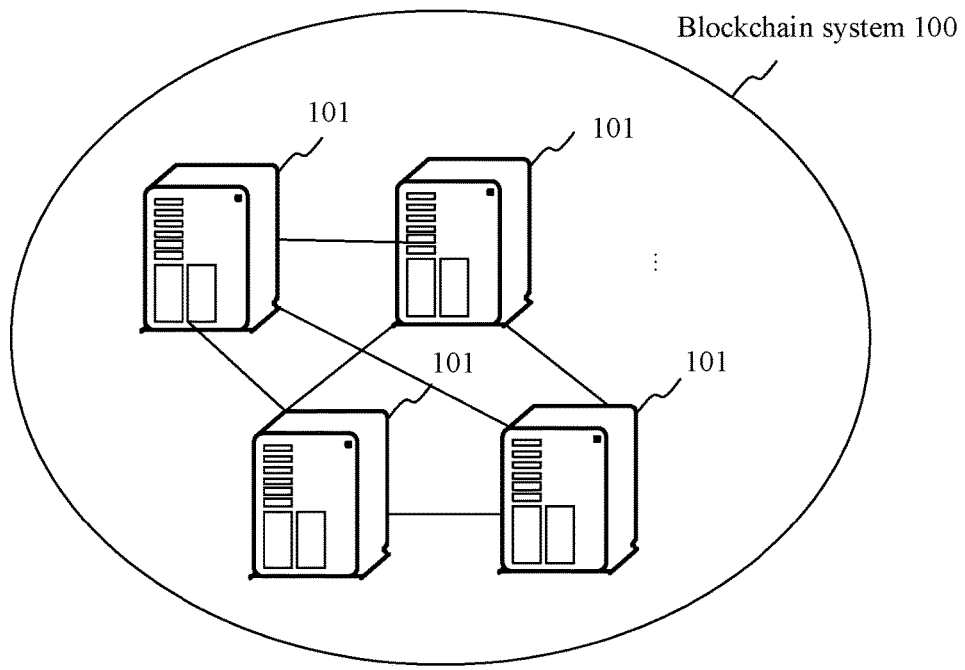
FIG. 1 is a system architecture diagram of a blockchain system according to an embodiment of this disclosure.

To explain the objectives, technical solutions, and advantages of this disclosure, the following further describes implementations of this disclosure in detail with reference to the accompanying drawings.

In the related art, because an original link (e.g., Uniform Resource Locator or URL) corresponding to a webpage is relatively long and is not conducive to promotion, a service provider of the original link usually generates a corresponding short link (e.g., shortened URL) for the original link through other service providers. As the name suggests, a short link is a relatively short link in form and can replace a long original link in form to access content corresponding to the original link. In this case, a user can only query a registered subject of a short link but cannot query a registered subject of an original link corresponding to the short link, and therefore cannot determine the security of the short link.

The exemplary embodiments are described herein in detail, and examples of the embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this disclosure. On the contrary, the implementations are merely examples of apparatuses and methods that are described in detail in the appended claims and that are consistent with some aspects of this disclosure.

Terms used in the embodiments of this disclosure are explained in the following.

A blockchain is a new application mode implementing computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include an underlying blockchain platform, a platform product service layer, and application service layer.

The blockchain underlying platform may include processing modules such as a user management module, a basic service module, an intelligent contract module, and an operation supervision module. The user management module is responsible for identity information management of all blockchain participants, including maintenance of public key and private key generation (account management), key management, and maintenance of a relationship between a user's real identity and a blockchain address (authority management), or the like, and in the case of authorization, supervising and auditing some real-identity transactions, and providing rule configuration of risk control (risk control audit). The basic service module is deployed on all blockchain node devices to verify the validity of a service request and records the service request on a storage after a consensus on a valid request is reached. For a new service request, the basic service module first performs interface adaptation analysis and authentication processing (interface adaptation), then encrypts service information through a consensus algorithm (consensus management), transmits the service information to a shared ledger (network communication) after encryption, and stores and records the service information. The smart contract module is responsible for contract registration and issuance as well as contract triggering and contract execution. Developers may define a contract logic through a programming language, release the programming language on a blockchain (contract registration), and call, according to a logic of contract terms, a private key or other events to trigger the execution to complete the contract logic, and further provide a function of upgrading and canceling the contract. The operation monitoring module is mainly responsible for deployment, configuration modification, contract configuration, cloud adaptation, and visual output of real-time status during product operation in a product release process, such as: alarms, monitoring network conditions, monitoring health status of a node device, or the like.

The platform product service layer provides basic capabilities and implementation frameworks for typical applications. Based on the basic capabilities, the developers may superimpose service features to complete a blockchain implementation of the service logic. The application service layer provides a blockchain solution-based application service for use by a service participant.

The consensus mechanism is a mathematical algorithm for building trust and obtaining rights and interests between different nodes in a blockchain system. In a blockchain system, a transaction can be verified and confirmed in a short time through voting of special node devices. For a transaction, if several node devices that are irrelevant to each other in terms of interests can reach a consensus, it can be considered that all node devices in the system can also reach a consensus.

A smart contract is a computer agreement designed to distribute, verify, or execute a contract in an information-based way. A contract program that each node device in the blockchain system automatically executes based on specific conditions may perform an operation on data stored on a chain and is an important path through which a user interacts with a blockchain and implements service logic by using the blockchain. An objective of the smart contract is to provide a better security method than a conventional contract and reduce other transaction costs related to a contract, and the smart contract permits trusted transactions to be performed without a third party, and these transactions are traceable and irreversible. The smart contract is triggered by transactions and can read, write, and calculate transaction data on a blockchain to support operations of various commercial applications. The smart contract can automatically execute a computerized program of contract terms, identify and determine data information obtained from the outside, and when conditions set by a central node and a consortium node are met, a system is then triggered to automatically execute corresponding contract terms, thereby completing transaction and transfer of general virtual resources/organization virtual resources in this embodiment of this disclosure. The smart contract in this embodiment of this disclosure includes a general part and a customized part. The general part supports basic functions such as identity authentication, transaction, and virtual resource transfer. The customized part is used for coping with differentiated application scenarios of a third node device. The third node device may implement special functions by configuring an independent smart contract.

A public key and a private key are a key pair (that is, one public key and one private key) obtained by using an algorithm. The public key is a public part in the key pair, and the private key is a non-public part in the key pair. The public key is usually used for encrypting data, authenticating a digital signature, or the like. The algorithm can ensure that the key pair obtained is unique. When using the key pair, if one of the keys is used to encrypt a piece of data, the other key needs to be used to decrypt the piece of data. For example, when the key pair is used, if data is encrypted by using the public key, the data needs to be decrypted by using the private key, or if data is encrypted by using the private key, the data needs to be decrypted by using the public key. Otherwise, the decryption fails.

This embodiment of this disclosure provides a blockchain system 100 implemented based on the foregoing blockchain technologies, and a system architecture of the blockchain system is described below.

In some embodiments, referring to FIG. 1, the blockchain system includes a plurality of node devices 101. In addition, the blockchain system further includes a client.

The node devices 101 are computing devices of any form in a network, such as servers, hosts, or user terminals. Data can be shared between the node devices 101. The node devices 101 may establish a peer-to-peer (P2P) network based on a P2P protocol. The P2P protocol is an application layer protocol that runs on top of a transmission control protocol (TCP).

In some embodiments, each node device 101 can receive input information and maintain shared data in the blockchain system based on the received input information. To ensure an information exchange in the blockchain system, information connections exist among all the node devices in the blockchain system, and information transmission may be performed among the node devices through the foregoing information connections. For example, when any node device in the blockchain system receives input information, another node device in the blockchain system obtains the input information based on a consensus algorithm, and stores the input information as data in shared data, so that data stored in all node devices in the blockchain system is consistent.

In some embodiments, each node device in the blockchain system has a node device identifier corresponding to the node device. Each node device in the blockchain system stores node device identifiers of other node devices in the blockchain system, to help subsequently broadcast a generated block to the other node devices in the blockchain system based on the node device identifiers of the other node devices. Each node device may maintain a node device identifier list shown in FIG. 1, and a node device name and a node device identifier are correspondingly stored in the node device identifier list. In some embodiments, a node device identifier is an Internet Protocol (IP) address or any other information that can be used for identifying the node device. In Table 1, description is made by using an IP address as an example.

TABLE 1

| Node device name | Node device identifier |
| --- | --- |
| Node device 1 | 117.114.151.174 |
| Node device 2 | 117.116.189.145 |
| ... | ... |
| Node device N | 119.123.789.258 |

Figure 2:
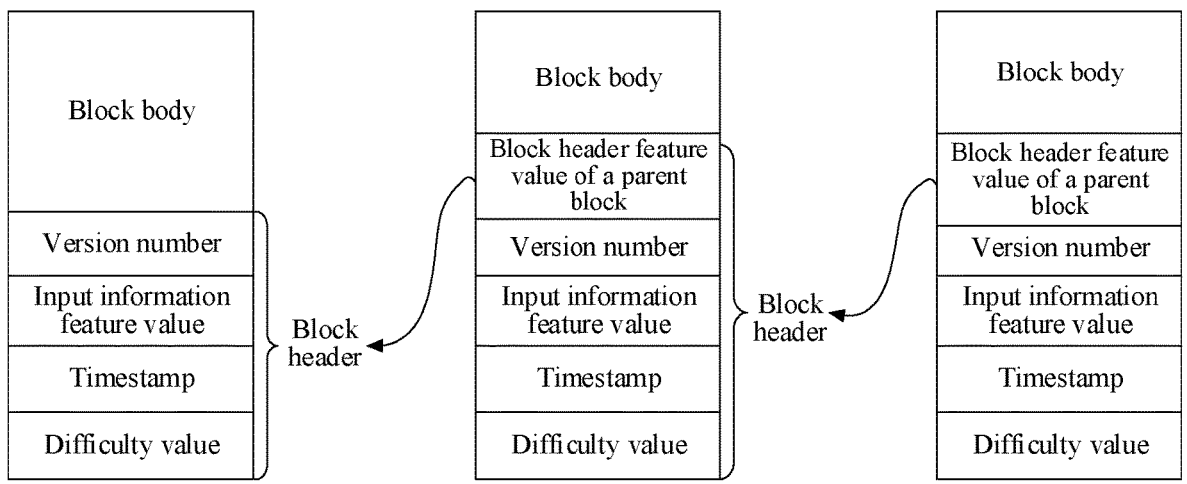
FIG. 2 is a schematic structural diagram of a blockchain according to an embodiment of this disclosure.

In some embodiments, each node device in the blockchain system stores the same blockchain. Referring to FIG. 2, the blockchain includes a plurality of blocks. A genesis block includes a block header and a block body. The block header stores an input information feature value, a version number, a timestamp, and a difficulty value. The block body stores input information. A next block of the genesis block uses the genesis block as a parent block, and also includes a block header and a block body. The block header stores an input information feature value of a current block, a block header feature value of the parent block, a version number, a timestamp, and a difficulty value. By analogy, block data stored in each block in the blockchain is associated with block data stored in the parent block, thereby ensuring the security of the input information in the blocks.

Figure 3:
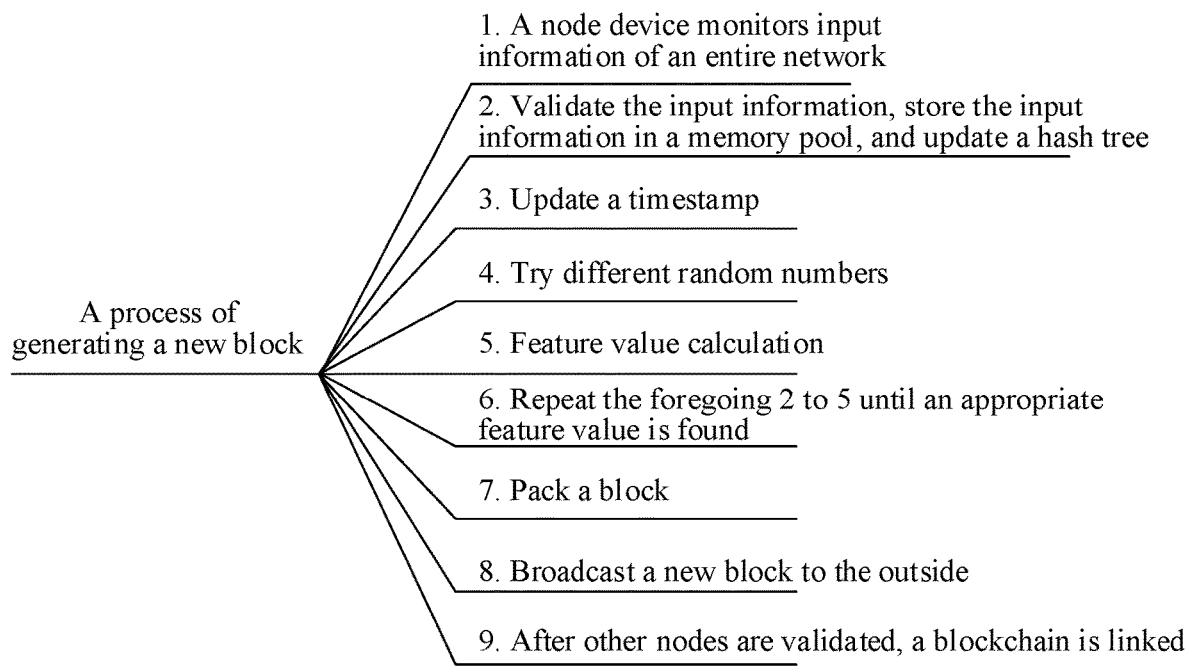
FIG. 3 is a flowchart of new block generation according to an embodiment of this disclosure.

When blocks are generated in the blockchain, referring to FIG. 3, a node device where the blockchain is located receives the inputted information, and the inputted information is verified. After the verification is completed, the inputted information is stored in a memory pool, and a hash tree used for recording the inputted information is updated. Next, the timestamp is updated to the time when the inputted information is received, different random numbers are tried, and feature value calculation is performed a plurality of times, so that the calculated feature value may satisfy the following formula:

$$SHA256(SHA256(version+prev\_hash+merkle\_root+ ntime+nbits+x))<TARGET$$

SHA256 is a feature value algorithm used to calculate a feature value; version is version information of a relevant block protocol in the blockchain; prev_hash is a block header feature value of a parent block of a current block; merkle_root is a feature value of input information; ntime is an update time of an update timestamp; nbits is current difficulty, which is a fixed value for a period of time, and is determined again after a fixed period of time; x is a random number; and TARGET is a feature value threshold, which can be determined based on nbits.

In this way, when a random number satisfying the above formula is obtained through calculation, information may be correspondingly stored, and a block header and a block body are generated, to obtain a current block. Subsequently, the node device where the blockchain is located transmits, based on the node identifier of another node device in the blockchain system, a newly generated block to the another node device in the blockchain system in which the node device is located, and the another node device verifies the newly generated block and add the newly generated block after the verification to the blockchain stored in the another node device.

A functional architecture of the node device 101 in the blockchain system is described below.

Figure 4:
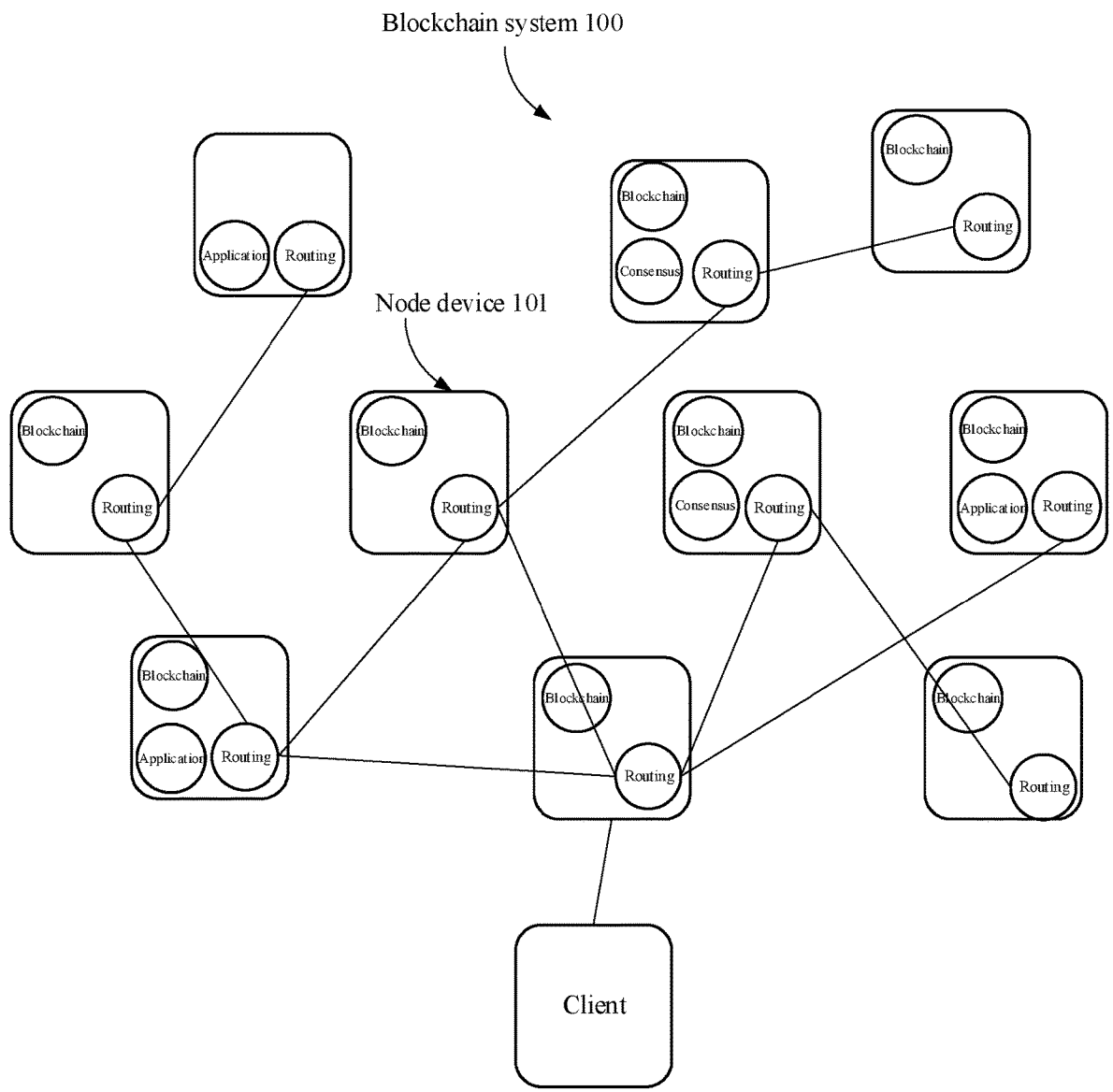
FIG. 4 is a functional architecture diagram of a node device in a blockchain system according to an embodiment of this disclosure.

Referring to FIG. 4, the node device 101 may functionally include a hardware layer, an intermediate layer, an operating system layer, and an application layer. Specific functions involved may include a routing function. Routing is a basic function of a node device and is used for supporting communication between the node devices.

In addition to the routing function, the node device may further have an application function deployed in a blockchain, and used for implementing a particular service according to an actual service requirement, recording data related to function implementation to form recorded data, adding a digital signature to the recorded data to indicate a source of task data, and transmitting the recorded data to another node device in the blockchain system, so that the another node device adds the recorded data to a temporary block when successfully verifying a source and integrity of the recorded data.

For example, the application function may implement a wallet service used for providing a transaction function with electronic money, including transaction initiation (that is, a transaction record of a current transaction is transmitted to another node device in the blockchain system, and the another node device writes, after successfully verifying the transaction record, recorded data of the transaction to a temporary block in a blockchain in response to admitting that the transaction is valid). The wallet further supports querying for remaining electronic money in an electronic money address.

For example, the application function may also implement a shared ledger service used for providing functions of operations such as storage, query, and modification of account data. Recorded data of the operations on the account data is transmitted to another node in the blockchain system. The another node device writes, after verifying that the account data is valid, the recorded data to a temporary block in response to admitting that the account data is valid, and may further transmit an acknowledgement to a node device initiating the operations.

For example, the application function may also implement a smart contract service, which is a computerized protocol used for executing conditions of a contract, and is implemented by using code that is deployed in the shared ledger and that is executed when a condition is satisfied. The code is used for completing, according to an actual service requirement, an automated transaction, for example, searching for a delivery status of goods purchased by a purchaser, and transferring electronic money of the purchaser to an address of a merchant after the purchaser signs for the goods. The smart contract is not limited only to a contract used for executing a transaction and may be further a contract used for processing received information.

A blockchain includes a series of blocks that are consecutive in a chronological order of generation. Once a new block is added to the blockchain, the new block is not removed. The block records recorded data submitted by the node device in the blockchain system.

The link detection method provided in this embodiment of this disclosure can be applied to related scenarios for link detection, for example, a scenario of detecting a link in a short message, a scenario of detecting a link in a Weibo post, a scenario of a detecting a link in chat information of a social application, a scenario of detecting a link in a product search bar of a shopping application, or a scenario of detecting a link entered in a browser search box.

Main steps of the link detection method provided in this embodiment of this disclosure are briefly described. First, an electronic device obtains first service provider information from a target text including a to-be-detected short link (i.e., a short link). The target text may include the short link and the first service provider information. Then, the electronic device obtains, based on the first service provider information, at least one short link (i.e., at least one reference short link) that is generated by a second service provider for a first service provider indicated by the first service provider information and meets a target condition, and the second service provider is configured to provide a short link generation service. Finally, the electronic device determines, in response to that the to-be-detected short link is not included in the at least one short link, that the to-be-detected short link is an insecure link. In the foregoing technical solution, at least one short link that is generated by the second service provider for the first service provider and meets the target condition is obtained, and then the at least one short link is compared with the to-be-detected short link in the target text to determine whether the to-be-detected short link is a short link generated for the first service provider, so as to determine whether the to-be-detected short link is secure.

Figure 5:
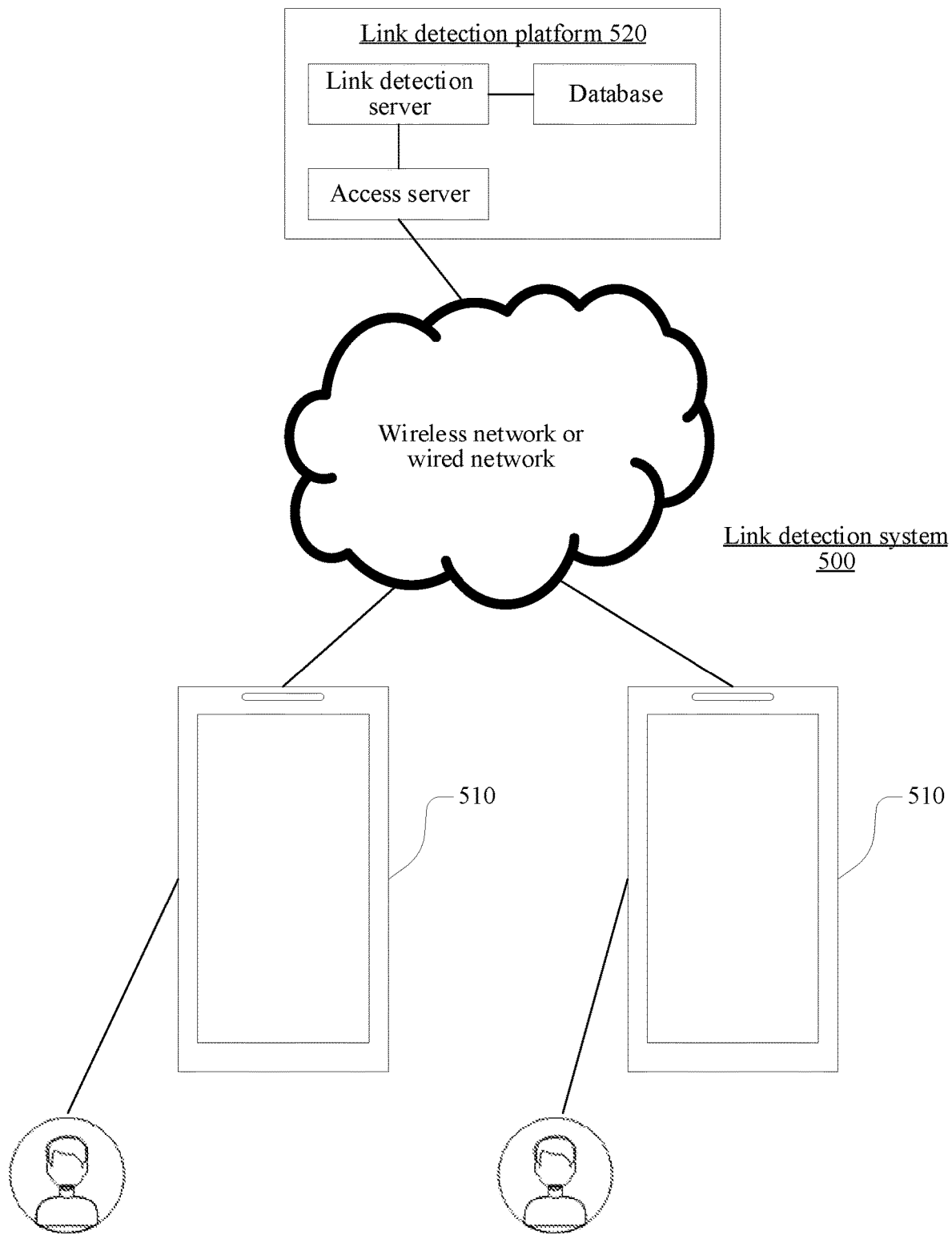
FIG. 5 is a structural block diagram of a link detection system according to an embodiment of this disclosure.

FIG. 5 is a structural block diagram of a link detection system 500 according to an embodiment of this disclosure. The link detection system 500 includes terminals 510 and a link detection platform 520.

Each terminal 510 is connected to the link detection platform 520 by a wireless network or a wired network. In some embodiments, the first terminal 510 is at least one of a smart phone, a game console, a desktop computer, a tablet computer, an e-book reader, a laptop portable computer, or an in-vehicle computer. An application program that supports link detection is installed and run on the terminal 510. In some embodiments, the application program is a communication application program, a social application program, a shopping application program, a browser application program, a security assistant application program, or the like. For example, the terminal 510 is a terminal used by a user, and a user account is logged in in the application program running on the terminal 510.

In some embodiments, the link detection platform 520 includes at least one of a server, a plurality of servers, a cloud computing platform, or a virtualization center. The link detection platform 520 is used for providing a backend service for the application program that supports link detection. In some embodiments, the link detection platform 520 undertakes main detection work, and the terminal 510 undertakes secondary detection work; or, the link detection platform 520 undertakes secondary detection work, and the terminal 510 undertakes main detection work; or, the link detection platform 520 or the terminal 510 may separately undertake detection work.

In some embodiments, the link detection platform 520 includes an access server, a link detection server, and a database. The access server is configured to provide an access service to the terminal 510. The link detection server is configured to provide a backend service related to link detection. There may be one or more link detection servers. When there are a plurality of link detection servers, at least two link detection servers are configured to provide different services, and/or at least two link detection servers are configured to provide the same service, for example, provide the same service in a load balancing manner, which is not limited in this embodiment of this disclosure. In this embodiment of this disclosure, the link detection platform 520 is constructed based on the node device 101 in the foregoing blockchain system 100.

The terminal 510 may generally refer to one of a plurality of terminals. In this embodiment, the terminal 510 is merely used as an example for description.

A person skilled in the art may understand that there may be more or fewer terminals. For example, there may be only one terminal, or there may be dozens of or hundreds or more terminals. In the present embodiment, the link detection system includes plural terminals. The quantity and the device type of the terminals are not limited in the embodiments of this disclosure.

The link detection method provided in this disclosure may be applied to a blockchain system or a non-blockchain system. When the link detection method is applied to the non-blockchain system, first link release information and second link release information involved in the link detection method, that is, information related to an original link and information related to a short link may be stored in a database with high credibility to ensure the validity of the first link release information and the second link release information. A query service for data stored in the database with high credibility may be provided by a first service provider involved in the link detection method, or may be provided by a second service provider involved in the link detection method, or may be provided by a third-party third service provider, or may be jointly provided by the first service provider, the second service provider, and another service provider after forming a consortium. When the link detection method is applied to the blockchain system, because the blockchain system is a data storage system with high credibility, the first link release information and the second link release information involved in the link detection method can be stored in the blockchain system. Correspondingly, the electronic device that performs the link detection method is a node device in the blockchain system, or a device that can communicate with a node device in the blockchain system. For example, the electronic device is the terminal 510 in FIG. 5, and the terminal 510 can communicate with the link detection platform 520 constructed based on the node device in the blockchain system to implement the link detection method.

Figure 6:
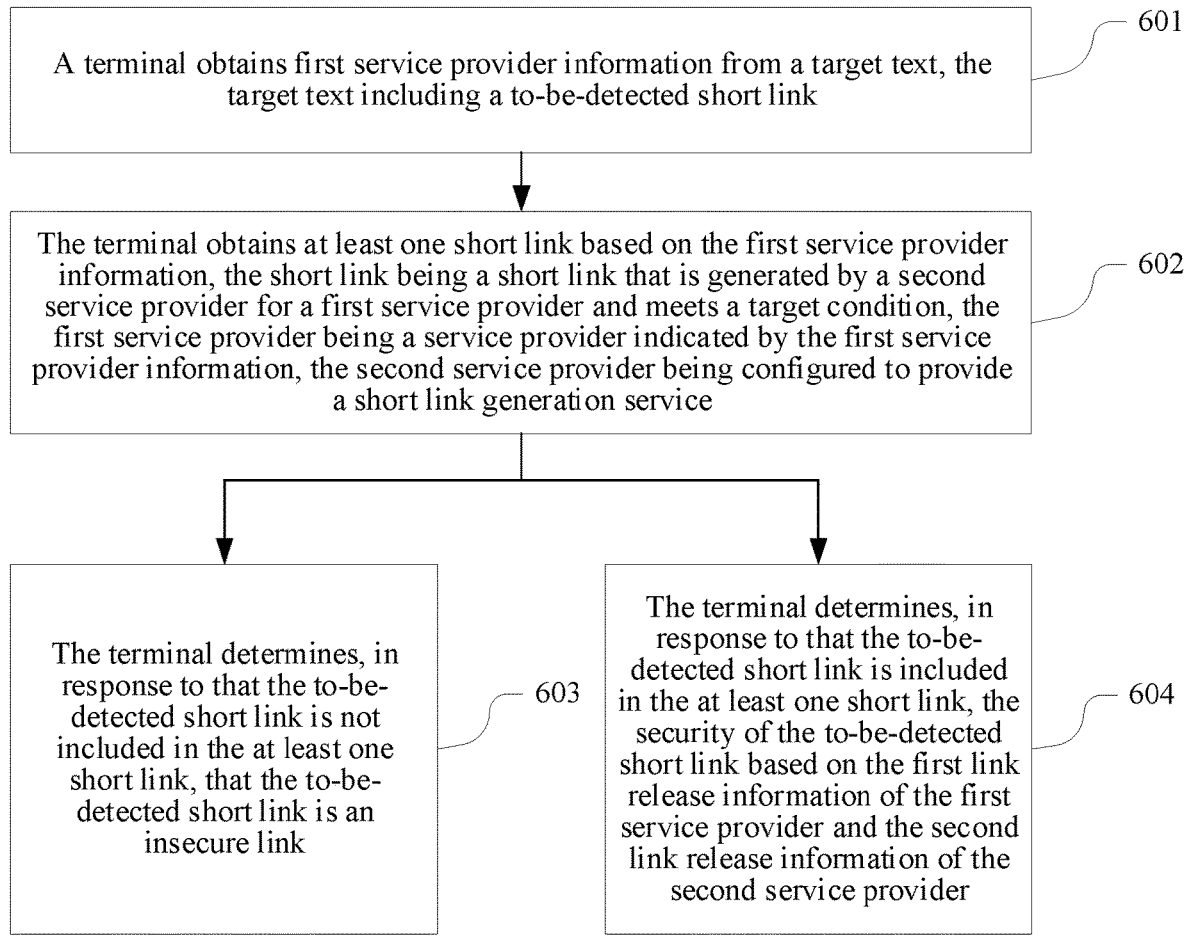
FIG. 6 is a flowchart of a link detection method according to an embodiment of this disclosure.

FIG. 6 is a flowchart of a link detection method according to an embodiment of this disclosure. As shown in FIG. 6, in this embodiment of this disclosure, the link detection method is applied to a blockchain system, and an example in which the electronic device is a terminal that can communicate with the node device in the blockchain system is used for description. The link detection method includes the following steps.

In step 601, the terminal obtains first service provider information from a target text, the target text including a to-be-detected short link.

In some embodiments, the terminal can receive the target text including the to-be-detected short link. Text content of the target text can be used for interpreting webpage content corresponding to the to-be-detected short link, or text content of the target text can be used for guiding a user to access a webpage corresponding to the to-be-detected short link. In some embodiments, the target text is a short message in a short message application, a chat message in a social networking application, or information content in an information application, or the like. A field in a fixed position of the target text can be used for representing the first service provider information. In some embodiments, the first service provider information is information used for identifying the first service provider, such as a name of the first service provider or a service provider identifier of the first service provider. The first service provider is used for providing a service described by content of the target text. The first service provider is used for providing relevant information about a webpage corresponding to an original link.

In some embodiments, the terminal can further perform punctuation detection on the target text, and the terminal uses, in response to detecting a target punctuation, a field indicated by the target punctuation as the first service provider information. In some embodiments, the target punctuation is quotation marks " " or brackets ( ), or the like, which are not limited in this embodiment of this disclosure. In addition, the terminal can further obtain the first service provider information by means of character identification, keyword matching, or the like, which is not limited in this disclosure.

In some embodiments, the to-be-detected short link is associated with one of a text, a picture, a video, or a button in the target text. For example, the target text includes a text hyperlink, and a link address of the text hyperlink is the to-be-detected short link. In another example, an image hyperlink in the target text is a to-be-detected short link, and the terminal performs, in response to detecting a trigger operation on the image, a link jump step based on the to-be-detected short link.

Descriptions are made by using an example in which the target text is a short message. Content of the short message is used for instructing a user of the terminal to modify the user's account information: "Your account information is expired. Please click url.cn.xxxxx to modify your account information to avoid affecting your normal gameplay "xx Game". "xx Game" indicates the first service provider, and "url.cn.xxxxx" is the to-be-detected short link. The terminal performs punctuation detection on content of the short message to detect whether there are target punctuations "[" and "]" in the content of the short message. When the two target punctuations are detected, the terminal uses a field between the two target punctuations, that is, "xx Game", as the first service provider information.

The target text can be transmitted by the first service provider indicated by the first service provider information or by the second service provider that generates the to-be-detected short link, and may further be transmitted by another service provider that provides an information push service, which is not limited in this disclosure.

In step 602, the terminal obtains at least one short link based on the first service provider information, the short link being a short link that is generated by a second service provider for a first service provider and meets a target condition, the first service provider being a service provider indicated by the first service provider information, the second service provider being configured to provide a short link generation service.

In some embodiments, after obtaining the first service provider information, the terminal can obtain second service provider information associated with the first service provider information based on the first service provider information. The terminal obtains the at least one short link from a short link associated with the second service provider information based on the second service provider information. In some embodiments, the target condition is at least one of a short link generation time being within a target time period, the short link being not expired, or a service type to which the short link belongs being consistent with a target service type indicated by the target text.

In some embodiments, the storage of the short link may be implemented in a plurality of different manners, for example, through blockchain-based storage. That is, in some embodiments, the terminal can obtain the second service provider information from the blockchain system. Correspondingly, the step of obtaining, by the terminal, second service provider information associated with the first service provider information based on the first service provider information may be: determining, by the terminal, a first block from a blockchain system based on the first service provider information, the first block being used for storing first link release information of the first service provider; and obtaining, by the terminal, the second service provider information from the first link release information of the first service provider stored in the first block. The first link release information is stored on the blockchain and therefore cannot be changed to avoid a case that a malicious user modifies the first link release information and provides incorrect second service provider information to the terminal, thereby ensuring that the short link obtained by the terminal is a secure and valid short link rather than a short link forged by the malicious user.

Descriptions are made by using an example in which the target text is a short message. The first service provider is a game service provider and can provide game-related services. The second service provider is a short link service provider and can provide a service for generating a short link. The first service provider provides the user with a webpage for modifying account information. A link of the webpage is an original link a. The second service provider generates at least one short link for the original link a. One of the short links is a short link b, and the short message includes the short link b, that is, url.cn.xxxxx. The first service provider stores the first service provider information, the original link a, and the second service provider information in the first link release information, and uploads the first link release information to a chain, so that the first link release information is stored in the first block. Then, the terminal may obtain the second service provider information from the first link release information. If the first link release information is not stored on the blockchain, a malicious user can modify the first link release information to make the terminal obtain forged malicious service provider information, and a short link associated with the malicious service provider information is a short link forged by the malicious user. In the foregoing method, the first link release information is stored on the blockchain, so that the first link release information cannot be changed, thereby ensuring that the short link obtained by the terminal is a secure and valid short link rather than a short link forged by the malicious user.

In some embodiments, the terminal can obtain the at least one short link from the blockchain system. Correspondingly, the step of obtaining, by the terminal based on the second service provider information, at least one short link that is generated by the second service provider for the first service provider and meets the target condition from the short link associated with the second service provider information may be: determining, by the terminal, a second block from a blockchain system based on the second service provider information, the second block being used for storing second link release information of the second service provider; and obtaining, by the terminal, at least one short link that is generated by the second service provider for the first service provider and meets the target condition from the second link release information of the second service provider stored in the second block. The second link release information is stored on the blockchain and therefore cannot be changed to avoid a case that a malicious user modifies the second link release information and provides a short link forged by the malicious user to the terminal, thereby ensuring that the short link obtained by the terminal is a secure and valid short link.

Descriptions are still made by using an example in which the target text is a short message. The second service provider stores the second service provider information and the generated plurality of short links in the second link release information and uploads the second link release information to a chain, so that the second link release information is stored in the second block. The plurality of short links generated by the second service provider include a short link b generated for the first service provider. Then, the terminal can obtain at least one short link that is generated for the first service provider and meets the target condition from the second link release information. If the second link release information is not stored on the blockchain, the malicious user can add a forged short link to the second link release information by modifying the second link release information, to make the terminal obtain the forged short link. When a to-be-detected short link is a malicious short link, the terminal may falsely believe that the to-be-detected short link is secure, and there is a security risk as a result. The second link release information is stored on the blockchain, so that the second link release information cannot be changed, thereby ensuring that the short link obtained by the terminal is a secure and valid short link.

In some embodiments, the terminal can use a generation time of a short link within a target time period as a target condition. Correspondingly, the step of obtaining, by the terminal, at least one short link that is generated by the second service provider for the first service provider and meets the target condition from the second link release information of the second service provider stored in the second block may be: determining, by the terminal, the target time period according to a receiving time of the target text. The terminal can filter a plurality of short links included in the second link release information of the second service provider stored in the second block, and obtain at least one short link generated by the second service provider for the first service provider within the target time period. The generation time of the short link is limited, so that during obtaining of the at least one short link, short links that are not within the target time period can be filtered out, thereby improving the obtaining efficiency.

Descriptions are still made by using an example in which the target text is a short message. The second service provider needs to generate the short link b first before the terminal can receive a short message including the short link b. Therefore, a generation time of the short link is not later than a receiving time of the short message. In addition, to ensure the timeliness of information, under normal circumstances, after being created, a webpage needs to be used within 24 hours, that is, the short link b corresponding to the original link a of the webpage is transmitted to the user. Therefore, a generation time of the short link is generally not 24 hours earlier than before a receiving time of the short message. That is, the target time period is 24 hours before the short message is received. The target time period may be set to 36 hours or 48 hours before the short message is received, which is not limited in this embodiment of this disclosure.

In some embodiments, the terminal can determine the at least one short link by using a service type as a target condition. Correspondingly, the second link release information further includes a service type corresponding to any short link generated by the second service provider, where one short link corresponds to one service type. The step of obtaining, by the terminal, at least one short link that is generated by the second service provider for the first service provider and meets the target condition from the second link release information of the second service provider stored in the second block may be: performing, by the terminal, content identification on the target text to determine a service type corresponding to the to-be-detected short link, and obtaining a target service type. The terminal obtains at least one short link that is generated by the second service provider for the first service provider and belongs to the target service type from the second link release information of the second service provider stored in the second block. The service type of the short link is limited, so that during obtaining of the at least one short link, short links that do not belong to the target service type can be filtered out, thereby improving the obtaining efficiency.

Descriptions are still made by using an example in which the target text is a short message. A service type corresponding to the original link a generated by the first service provider is A. When the second service provider generates at least one short link for the original link a, a service type of the generated at least one short link can also be set to A. The service type A corresponds to a plurality of short links. The short link b corresponding to the original link a corresponds to only one service type. The second service provider stores a service type corresponding to the short link in the second link release information. The terminal performs content identification on content of the short message, so that it can be determined that the short message indicates a service for modifying an account information type, and the modifying an account information type is used as the target service type. The terminal selects at least one short link whose service type is the target service type from the second link release information.

In some embodiments, the terminal can determine the at least one short link by using a condition of whether the short link is expired as the target condition. Correspondingly, the second link release information further includes time limit information corresponding to any short link generated by the second service provider, and the time limit information is used for indicating whether the short link is expired. The step of obtaining, by the terminal, at least one short link that is generated by the second service provider for the first service provider and meets the target condition from the second link release information of the second service provider stored in the second block may be: obtaining, by the terminal, at least one piece of time limit information from the second link release information of the second service provider stored in the second block. The terminal obtains, based on the at least one piece of time limit information, at least one unexpired short link generated by the second service provider for the first service provider from the second link release information. The time limit information of the short link is obtained, so that when the at least one short link is obtained, expired short links can be filtered out, thereby improving the obtaining efficiency and also improving the validity of the obtained at least one short link.

Descriptions are still made by using an example in which the target text is a short message. When generating the short link b, the second service provider can set time limit information of the short link b, and within a validity period indicated by the time limit information, the short link b can be triggered to jump to the original link a. In some embodiments, the short link b points to an original link c in January, points to an original link d in February, and currently points to the original link a. The second service provider may store the time limit information in the second link release information.

This embodiment of this disclosure exemplarily shows a process of determining the at least one short link according to different target conditions. In fact, the at least one short link can further be determined according to two or more target conditions at the same time. The target conditions can be freely combined, which is not limited in this embodiment of this disclosure.

The storage of the short link can be implemented in another manner, for example, through cloud storage. That is, information related to the short link and information related to the original link are stored by a plurality of service providers related to the short link in a database with high credibility, and the database with high credibility may be built by using cloud storage technology. The database with high credibility can provide an information query entry and set an access right to ensure data security. When obtaining the at least one short link, the terminal can transmit an obtaining request to a link detection server through a link detection client, and the at least one short link is obtained by the link detection server having an access right to the database with high credibility. A database with high credibility is set up, so that it is ensured that the information stored by the plurality of service providers related to the short link is not easily tampered with and the privacy of the information is also ensured. For example, a security assistant may be installed on a mobile phone, and a backend server of the security assistant has access right to the database with high credibility, so that the information related to the short link and the information related to the original link can be obtained, so as to implement detection of the to-be-detected short link. A short message sender, a network service provider, and an information security supervision department may all have access rights to the database with high credibility.

In step 603, the terminal determines, in response to a determination that the to-be-detected short link is not included in the at least one short link, that the to-be-detected short link is an insecure link.

In this embodiment of this disclosure, after obtaining the at least one short link, the terminal can compare the to-be-detected short link with the at least one short link one by one. If none of the at least one short link is the same as the to-be-detected short link, it is determined that the second service provider has not generated the to-be-detected short link. That is, the to-be-detected short link may be a malicious short link forged by a malicious user. Therefore, the terminal can determine that the to-be-detected short link is an insecure link.

In some embodiments, the terminal can process the target text based on a detection result. Correspondingly, the step of processing the target text by the terminal may be: obtaining, by the terminal, a target processing manner corresponding to the target text, and processing, by the terminal, the target text based on the target processing manner, the target processing manner including at least one of isolation, deletion, labeling, or display of prompt information. By automatically processing a target text including an insecure short link, the terminal can reduce the risk that the user is deceived by a malicious user and protect the user's information security.

Descriptions are still made by using an example in which the target text is a short message. After determining that the short link b included in the short message is an insecure link, the terminal displays prompt information, such as "url.cn.xxxxx is an insecure link. Please pay attention to information security". The terminal can further isolate the short message. For example, the short message is marked as an intercepted message, and the short link in the intercepted message is in an unclickable state to prevent the user from clicking the insecure short link b by mistake. The terminal can further directly delete the short message when the user sets a delete right, and the deleted short message can be temporarily stored in a recycle bin to facilitate viewing by the user. The terminal can further prompt the short link b to be insecure in a labeling manner, such as highlighting the short message in red and labeling the short message with a word "insecure". The foregoing example shows a processing process in which the target text is a short message, and the foregoing processing process is also applicable to a target text in another form, which is not limited in this embodiment of this disclosure.

In some embodiments, the terminal can display a detection result to the user and process the target text based on an operation of the user. Correspondingly, the step of processing the target text by the terminal may be displaying, by the terminal, a target interface in response to receiving a selection operation of the user, the target interface including tabs such as delete, trust, and query. The terminal performs an operation corresponding to any tab in response to a trigger operation of the tab.

Descriptions are still made by using an example in which the target text is a short message. In addition to displaying the detection result to the user, that is, displaying whether the short link is secure or not, the terminal can further display an owner of the original link corresponding to the to-be-detected short link to the user. If the owner displayed by the terminal is not the xx Game in the short message, the user determines that the link is not secure, and the user can choose to delete the short message. If the owner displayed by the terminal is the xx Game in the short message, it indicates that the terminal may make an incorrect determination, the user can determine that the link is secure, and the user can also choose to trust the short message. If the user decides that the user is not to receive the short message for modifying the account information, the user can choose to make a query, and the terminal obtains the short message from the first link release information and displays a transmission list of the short message to the user, so that the user can determine whether the received short message is appropriate.

For the processing manner of the target text, a preset target processing manner can be used by the terminal for automatic implementation. That is, if it is detected that there is a security problem in the short link in the target text, the target processing manner is directly performed on the target text, thereby improving the security and the intelligence of security detection.

In step 604, the terminal determines, in response to a determination that the to-be-detected short link is included in the at least one short link, the security of the to-be-detected short link based on the first link release information of the first service provider and the second link release information of the second service provider.

In this embodiment of this disclosure, if the to-be-detected short link is included in at least one short link, it indicates that the short link is OK and is not a forged malicious short link, and the terminal may further verify the short link to determine whether the short link is secure.

In some embodiments, the terminal can perform further detection on the short link based on the time limit information that is included in the second link release information and corresponds to any short link generated by the second service provider, and the time limit information is used for indicating whether the short link is expired. Correspondingly, the step of further verifying the short link by the terminal may be: obtaining, by the terminal, target time limit information in response to that the to-be-detected short link is included in the at least one short link, the target time limit information being time limit information corresponding to the to-be-detected short link obtained from the second link release information; and displaying, by the terminal, first prompt information in response to the target time limit information indicating that the to-be-detected short link is expired, the first prompt information being used for prompting that the to-be-detected short link is expired. It is determined by using time limit information whether the to-be-detected short link is still valid currently, so that the user is prevented from accessing an invalid short link or a short link pointing to a malicious website, thereby ensuring the information security of the user.

Descriptions are still made by using an example in which the target text is a short message. Time limit information corresponding to the short link b generated by the second service provider indicates that the short link b is expired. That is, the short link b currently no longer points to the original link a, but instead points to the original link d. A webpage corresponding to the original link d may be a webpage generated or hijacked by a malicious user and is used for defrauding the user of property information. In some embodiments, the terminal prompts the user by displaying prompt information like "The short link is expired, and there is a risk".

In some embodiments, the terminal can perform, based on first content information that is included in the second link release information and corresponds to any short link generated by the second service provider, further detection on the short link. The first content information is used for indicating at least one of a page screenshot, a page feature value, or page parameter information corresponding to the short link. Correspondingly, the step of further verifying, by the terminal, the short link may be obtaining, by the terminal, target first content information in response to that the to-be-detected short link is included in the at least one short link, the target first content information being first content information corresponding to the to-be-detected short link obtained from the second link release information; and displaying, by the terminal, second prompt information in response to the target first content information being inconsistent with content information obtained by accessing the to-be-detected short link, the second prompt information being used for indicating that the to-be-detected short link is an insecure link. The target first content information corresponding to the short link stored in the blockchain is compared with the content information obtained through actual access, it can be determined whether there is a change in content of a webpage to which the to-be-detected short link actually jumps. The user is prompted when there is a change, thereby ensuring the information security of the user.

Descriptions are still made by using an example in which the target text is a short message. After generating the short link b for the original link a, the second service provider further obtains content information corresponding to the short link b, for example, a screenshot of the short link b jumping to the original link a, a screenshot of a webpage corresponding to the original link a, a feature value of a webpage corresponding to the original link a, and a label parameter of the webpage corresponding to the original link a, and stores the content information in the second link release information. The screenshot may include screenshots of the webpage corresponding to the original link a displayed on different devices, for example, a screenshot on a computer and a screenshot on a mobile phone. The terminal may verify a feature value in content information by at least one of the Message-Digest algorithm 5 (MD5), the Term Frequency (TF) algorithm, the Document Frequency (DF) algorithm, or Term Frequency-Inverse Document Frequency (TF-IDF) algorithm. The terminal can further compare the screenshot of the webpage in the content information through an image identification algorithm. The terminal may determine, based on a verification result and a comparison result, whether the target first content information is consistent with content information obtained through actual access. If not, it indicates that there is a change in content of the webpage to which the to-be-detected short link actually jumps, and there may be a risk of defrauding the user of information. In some embodiments, the terminal displays prompt information like "The content of the webpage is changed and there is a risk" to prompt the user. The target first content information and the content information obtained through actual access do not have to be 100% the same. If there is a similarity above a target threshold such as 90%, 85%, or 80%, the terminal can also determine that the target first content information is consistent with the content information obtained through actual access, and there is no risk.

In some embodiments, the terminal can perform, based on an original link corresponding to any short link that is included in the second link release information and is generated by the second service provider and the second content information corresponding to the original link included in the first link release information, further detection on the short link. The second content information is used for indicating at least one of a page screenshot, a page feature value, or page parameter information corresponding to the original link. Correspondingly, the step of further verifying, by the terminal, the short link may be obtaining by the terminal, a target original link in response to that the to-be-detected short link is included in the at least one short link, the target original link being an original link corresponding to the to-be-detected short link obtained from the second link release information; obtaining, by the terminal, target second content information, the target second content information being second content information corresponding to the target original link obtained from the first link release information; and displaying, by the terminal, third prompt information in response to that the target second content information is inconsistent with content information obtained by accessing the to-be-detected short link, the third prompt information being used for indicating that the to-be-detected short link is an insecure link. The target second content information corresponding to the short link stored in the blockchain is compared with the content information obtained through actual access, so that it can be determined whether there is a change in content of a webpage to which the to-be-detected short link actually jumps. The user is prompted when there is a change, thereby ensuring the information security of the user.

Descriptions are still made by using an example in which the target text is a short message. After creating a webpage corresponding to the original link a, the first service provider can store parameter information such as label information of the page corresponding to the original link a and content information corresponding to the original link a such as a feature value of the page corresponding to the original link a and a screenshot of the page corresponding to the original link a in the first link release information. The screenshot includes screenshots of the webpage corresponding to the original link a displayed on different devices, for example, a screenshot on a computer and a screenshot on a mobile phone. For a manner in which the terminal compares the content information, reference may be made to the content of the previous example, and details are not repeated herein.

In some embodiments, the terminal can perform, based on an original link corresponding to any short link that is included in the second link release information and is generated by the second service provider and an account list corresponding to the original link included in the first link release information, further detection on the short link. The account list is used for indicating at least one account that receives the original link. Correspondingly, the step of further verifying, by the terminal, the short link may be obtaining by the terminal, a target original link in response to that the to-be-detected short link is included in the at least one short link, the target original link being an original link corresponding to the to-be-detected short link obtained from the second link release information; obtaining, by the terminal, a target account list, the target account list being an account list corresponding to the target original link obtained from the first link release information; and displaying, by the terminal, fourth prompt information in response to that an account currently logged in by a terminal is not in the target account list, the fourth prompt information being used for indicating that the to-be-detected short link is an insecure link. It is found through comparison whether a currently logged-in account is in the target account list, so that it can be determined whether the target text is transmitted incorrectly, thereby avoiding a case that the user blindly performs an operation based on the target text, the time of the user is wasted, and there is a risk of information leakage.

Descriptions are still made by using an example in which the target text is a short message. The first service provider can set an account list for each original link for receiving the original link or a short link corresponding to the original link. In some embodiments, an account in the account list is a mobile phone number, or International Mobile Equipment Identity (IMEI), or the like. The terminal obtains an account list corresponding to the original link a. If there is an account currently logged in by the terminal in the list, it indicates that the to-be-detected short link is indeed transmitted to the user of the terminal. If there is not an account currently logged in by the terminal in the list, it indicates that the to-be-detected short link is indeed not transmitted to the user of the terminal. The terminal determines that the to-be-detected short link has a certain risk, and in some embodiments, the terminal prompts the user by displaying prompt information like "An information transmission object is incorrect. Please pay attention to information security".

In addition to being used for performing detection on the to-be-detected short link, information such as first service provider information, second service provider information associated with the first service provider information, at least one original link, content information corresponding to any original link, and an account list corresponding to any original link included in the first link release information and information such as the second service provider information, at least one short link, content information corresponding to any short link, and time limit information corresponding to any short link included in the second link release information can further be used as deposit information. The terminal may receive a deposit instruction triggered by the user and generate deposit information in response to receiving the deposit instruction. The deposit information being used for indicating information associated with a process of accessing a page corresponding to the to-be-detected short link. The deposit information includes, but not limited to, the first link release information and the second link release information. The deposit information may further include a channel parameter such as a short message delivery port number in the short message industry. The deposit information may further include device information collected with the user's consent, such as a browser version, a browser type, terminal device information, network parameters or the like. The terminal device information may be an Internet protocol (IP) address, and a media access control (MAC) address.

In some embodiments, after receiving the deposit instruction, the terminal transmits a report request to a forensic device, the report request instructing the forensic device to collect evidence on the to-be-detected short link. After the report request is transmitted, a forensic device of an impartial institution can automatically collect evidence, which avoids the problem that evidence fails to be collected because the impartial institution cannot collect evidence during non-working hours.

For example, if a malicious user modifies content of a webpage corresponding to a short link to illegal content during the non-working hours of the impartial institution, such as midnight, while the content corresponding to the short link is normal content at other time periods, the impartial institution cannot rely on individuals to collect evidence on the short link. This problem can be resolved through triggering by a report request, so that evidence can be collected whenever a report is received.

The foregoing steps 601-604 are exemplary implementations of the embodiments of this disclosure, and the link detection method provided in this disclosure can be implemented in another implementation. For example, the first service provider stores at least one short link generated by the second service provider in the first link release information of the first service provider to omit the step of obtaining, by the terminal, the at least one short link, thereby saving time. Alternatively, information used in a link detection process can be stored in a non-blockchain system with high credibility, so that the link detection method does not rely on the blockchain system, so as to extend the application scope of the link detection method. This is not limited in this embodiment of this disclosure.

The foregoing steps 601-604 exemplarily show a manner in which link detection is performed by the terminal. Before the terminal receives the target text, the target text may further be reviewed by a plurality of intermediate service providers, such as a short message service provider, a network operator, and a service proxy. For any intermediate service provider, the intermediate service provider can use the link detection method provided in this disclosure to obtain the first link release information and the second link release information from the blockchain when receiving the target text including the to-be-detected short link and perform detection on the to-be-detected short link.

In this embodiment of this disclosure, at least one short link that is generated by the second service provider for the first service provider and meets the target condition is obtained, and then the at least one short link is compared with the to-be-detected short link in the target text to determine whether the to-be-detected short link is a short link generated for the first service provider, so as to determine whether the to-be-detected short link is secure.

Figure 7:
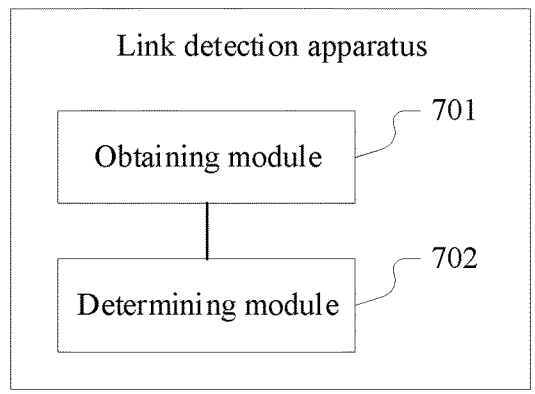
FIG. 7 is a block diagram of a link detection apparatus according to an embodiment of this disclosure.

FIG. 7 is a block diagram of a link detection apparatus according to an embodiment of this disclosure. The apparatus is configured to perform the steps when the foregoing link detection method is performed. Referring to FIG. 7, the apparatus includes an obtaining module 701 and a determining module 702. One or more modules of the apparatus can be implemented by processing circuitry, software, or a combination thereof, for example.

The obtaining module 701 is configured to obtain first service provider information from a target text, the target text including a to-be-detected short link.

The obtaining module 701 is further configured to obtain at least one short link based on the first service provider information, the short link being a short link that is generated by a second service provider for a first service provider and meets a target condition, the first service provider being a service provider indicated by the first service provider information, the second service provider being configured to provide a short link generation service.

The determining module 702 is configured to determine, in response to that the to-be-detected short link is not included in the at least one short link, that the to-be-detected short link is an insecure link.

In some embodiments, the obtaining module 701 is further configured to: obtain second service provider information associated with the first service provider information based on the first service provider information; and obtain at least one short link from a short link associated with the second service provider information based on the second service provider information.

In some embodiments, the obtaining module 701 is further configured to: determine a first block from a blockchain system based on the first service provider information, the first block storing first link release information of the first service provider; and obtain the second service provider information from the first link release information of the first service provider stored in the first block.

In some embodiments, the obtaining module 701 is further configured to: determine a second block from a blockchain system based on the second service provider information, the second block storing second link release information of the second service provider; and obtain the at least one short link from the second link release information of the second service provider stored in the second block.

In some embodiments, the target condition is at least one of the following: a short link generation time being within a target time period; the short link being not expired; and a service type to which the short link belongs being consistent with a target service type indicated by the target text.

In some embodiments, the obtaining module 701 is further configured to: determine the target time period according to a receiving time of the target text; and filter a plurality of short links included in the second link release information of the second service provider stored in the second block to obtain the at least one short link.

In some embodiments, the second link release information further includes a service type corresponding to any short link generated by the second service provider, one short link corresponding to one service type; and the obtaining module 701 is further configured to: perform content identification on the target text to determine a target service type corresponding to the to-be-detected short link; and obtain at least one short link belonging to the target service type from the second link release information of the second service provider stored in the second block.

In some embodiments, the second link release information further includes time limit information corresponding to any short link generated by the second service provider, and the time limit information is used for indicating whether the short link is expired; and the obtaining module 701 is further configured to: obtain at least one piece of time limit information from the second link release information of the second service provider stored in the second block; and obtain at least one unexpired short link from the second link release information based on the at least one piece of time limit information.

In some embodiments, the second link release information further includes time limit information corresponding to any short link generated by the second service provider, and the time limit information is used for indicating whether the short link is expired. The apparatus further includes: the obtaining module 701, further configured to obtain target time limit information in response to that the to-be-detected short link is included in the at least one short link, the target time limit information being time limit information corresponding to the to-be-detected short link obtained from the second link release information; and a first display module, configured to display first prompt information in response to the target time limit information indicating that the to-be-detected short link is expired, the first prompt information prompting that the to-be-detected short link is expired.

In some embodiments, the second link release information further includes first content information corresponding to any short link generated by the second service provider, and the first content information is used for indicating at least one of a page screenshot, a page feature value, or page parameter information corresponding to the short link.

The apparatus further includes: the obtaining module 701, further configured to obtain target first content information in response to that the to-be-detected short link is included in the at least one short link, the target first content information being first content information corresponding to the to-be-detected short link obtained from the second link release information; and a second display module, configured to display second prompt information in response to the target first content information being inconsistent with content information obtained by accessing the to-be-detected short link, the second prompt information indicating that the to-be-detected short link is an insecure link.

In some embodiments, the second link release information further includes an original link corresponding to any short link generated by the second service provider, the first link release information further includes second content information corresponding to the original link, and the second content information is used for indicating at least one of a page screenshot, a page feature value, or page parameter information corresponding to the original link.

The apparatus further includes: the obtaining module 701, further configured to obtain a target original link in response to that the to-be-detected short link is included in the at least one short link, the target original link being an original link corresponding to the to-be-detected short link obtained from the second link release information, and further configured to obtain target second content information, the target second content information being second content information corresponding to the target original link obtained from the first link release information; and a third display module, configured to display third prompt information in response to that the target second content information is inconsistent with content information obtained by accessing the to-be-detected short link, the third prompt information indicating that the to-be-detected short link is an insecure link.

In some embodiments, the second link release information further includes an original link corresponding to any short link generated by the second service provider, the first link release information further includes an account list corresponding to the original link, and the account list is used for indicating at least one account that receives the original link.

The apparatus further includes: the obtaining module 701, further configured to obtain a target original link in response to that the to-be-detected short link is included in the at least one short link, the target original link being an original link corresponding to the to-be-detected short link obtained from the second link release information, and further configured to obtain a target account list, the target account list being an account list corresponding to the target original link obtained from the first link release information; and a fourth display module, configured to display fourth prompt information in response to that an account currently logged in by a terminal is not in the target account list, the fourth prompt information indicating that the to-be-detected short link is an insecure link.

In some embodiments, the apparatus further includes: the obtaining module 701, further configured to obtain a target processing manner corresponding to the target text, the target processing manner including at least one of isolation, deletion, labeling, or display of prompt information; and a text processing module, configured to process the target text based on the target processing manner.

In some embodiments, the apparatus further includes: a generation module, configured to generate deposit information in response to receiving a deposit instruction, the deposit information indicating information associated with a process of accessing a page corresponding to the to-be-detected short link; and a submission module, configured to submit the deposit information.

In some embodiments, the apparatus further includes: a request transmission module, configured to transmit a report request to a forensic device, the report request for instructing the forensic device to collect evidence on the to-be-detected short link.

In some embodiments, the obtaining module 701 is further configured to: perform punctuation detection on the target text including the to-be-detected short link; and use, in response to detecting a target punctuation, a field indicated by the target punctuation as the first service provider information.

In some embodiments, the to-be-detected short link is associated with at least one of a text, a picture, a button, or a video in the target text.

When the link detection apparatus provided in the foregoing embodiment runs an application program, division of the foregoing functional modules is merely an example for description. In a practical application, the foregoing functions may be assigned to and completed by different modules as needed, that is, the internal structure of the apparatus is divided into different functional modules to implement all or some of the functions described above. In addition, the link detection apparatus and link detection method embodiments provided in the foregoing embodiments belong to the same concept. For the specific implementation process, reference may be made to the method embodiments, and details are not described herein again.

In this embodiment of this disclosure, an electronic device can be implemented as a terminal or a server. When the electronic device is implemented as a terminal, operations performed by the foregoing link detection method can be implemented by the terminal. When the electronic device is implemented as a server, the operations performed by the foregoing linking method can be implemented by the server, and the operations performed by the foregoing link detection method can also be implemented by an interaction between the server and the terminal.

Figure 8:
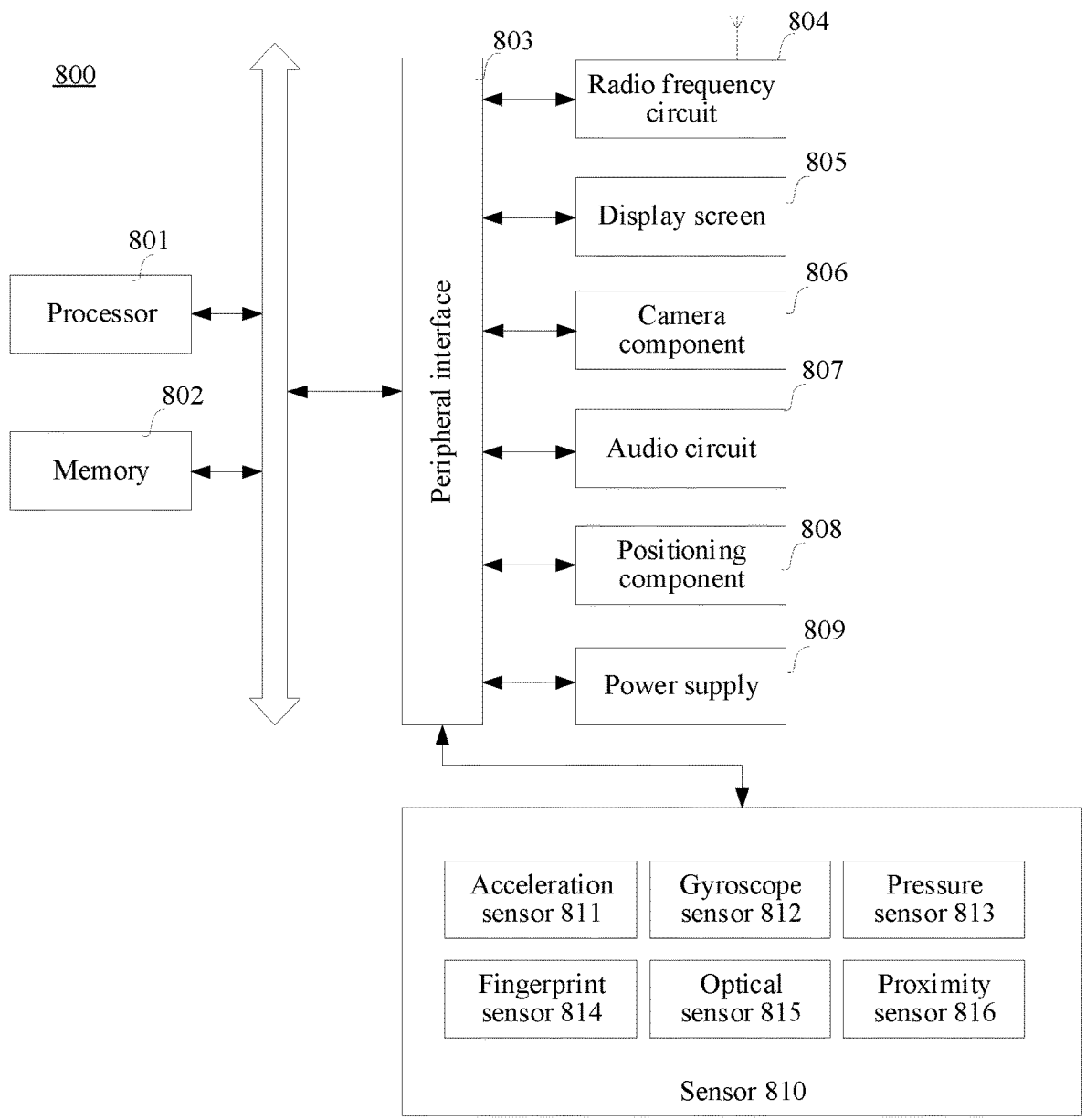
FIG. 8 is a schematic structural diagram of a terminal according to an embodiment of this disclosure.

The electronic device can be implemented as the terminal. FIG. 8 is a structural block diagram of a terminal 800 according to an exemplary embodiment of this application. FIG. 8 is a structural block diagram of a terminal 800 according to an exemplary embodiment of this disclosure. The terminal 800 may be a smart phone, a tablet computer, a moving picture experts group audio layer III (MP3) player, a moving picture experts group audio layer IV (MP4) player, a notebook computer, or a desktop computer. The terminal 800 may also be referred to as user equipment, a portable terminal, a laptop terminal, a desktop terminal, or by another name.

Generally, the terminal 800 includes processing circuitry (e.g., a processor 801) and a memory 802 (e.g. a non-transitory computer-readable storage medium).

The processor 801 may include one or more processing cores, for example, a 4-core processor or an 8-core processor. The processor 801 may be implemented by using at least one hardware form of a digital signal processor (DSP), a field-programmable gate array (FPGA), and a programmable logic array (PLA). The processor 801 may alternatively include a main processor and a coprocessor. The main processor is configured to process data in an active state, also referred to as a central processing unit (CPU). The coprocessor is a low-power processor configured to process data in a standby state. In some embodiments, the processor 801 may be integrated with a graphics processing unit (GPU). The GPU is configured to render and draw content that needs to be displayed on a display. In some embodiments, the processor 801 may further include an artificial intelligence (AI) processor. The AI processor is configured to process computing operations related to machine learning.

The memory 802 may include one or more computer-readable storage media. The computer-readable storage medium may be non-transient. The memory 802 may further include a high-speed random access memory and a nonvolatile memory, for example, one or more disk storage devices or flash storage devices. In some embodiments, the non-transient computer-readable storage medium in the memory 802 is configured to store at least one instruction, and the at least one instruction is configured to be executed by the processor 801 to implement the following operations: obtaining first service provider information from a target text, the target text including a to-be-detected short link; obtaining at least one short link based on the first service provider information, the short link being a short link that is generated by a second service provider for a first service provider and meets a target condition, the first service provider being a service provider indicated by the first service provider information, the second service provider being configured to provide a short link generation service; and determining, in response to that the to-be-detected short link is not included in the at least one short link, that the to-be-detected short link is an insecure link.

In some embodiments, the processor is further configured to perform the following operations: obtaining second service provider information associated with the first service provider information based on the first service provider information; and obtaining at least one short link from a short link associated with the second service provider information based on the second service provider information.

In some embodiments, the processor is further configured to perform the following operations: determining a first block from a blockchain system based on the first service provider information, the first block storing first link release information of the first service provider; and obtaining the second service provider information from the first link release information of the first service provider stored in the first block.

In some embodiments, the processor is further configured to perform the following operations: determining a second block from a blockchain system based on the second service provider information, the second block storing second link release information of the second service provider; and obtaining the at least one short link from the second link release information of the second service provider stored in the second block.

In some embodiments, the target condition is at least one of the following: a short link generation time being within a target time period; the short link being not expired; and a service type to which the short link belongs being consistent with a target service type indicated by the target text.

In some embodiments, the processor is further configured to perform the following operations: determining the target time period according to a receiving time of the target text; and filtering a plurality of short links included in the second link release information of the second service provider stored in the second block to obtain the at least one short link.

In some embodiments, the second link release information further includes a service type corresponding to any short link generated by the second service provider, one short link corresponding to one service type; and the processor is further configured to perform the following operations: performing content identification on the target text to determine a target service type corresponding to the to-be-detected short link; and obtaining at least one short link belonging to the target service type from the second link release information of the second service provider stored in the second block.

In some embodiments, the second link release information further includes time limit information corresponding to any short link generated by the second service provider, and the time limit information is used for indicating whether the short link is expired; and the processor is further configured to perform the following operations: obtaining at least one piece of time limit information from the second link release information of the second service provider stored in the second block; and obtaining at least one unexpired short link from the second link release information based on the at least one piece of time limit information.

In some embodiments, the second link release information further includes time limit information corresponding to any short link generated by the second service provider, and the time limit information is used for indicating whether the short link is expired; and the processor is further configured to perform the following operations: obtaining target time limit information in response to that the to-be-detected short link is included in the at least one short link, the target time limit information being time limit information corresponding to the to-be-detected short link obtained from the second link release information; and displaying first prompt information in response to the target time limit information indicating that the to-be-detected short link is expired, the first prompt information prompting that the to-be-detected short link is expired.

In some embodiments, the second link release information further includes first content information corresponding to any short link generated by the second service provider, and the first content information is used for indicating at least one of a page screenshot, a page feature value, or page parameter information corresponding to the short link; and the processor is further configured to perform the following operations: obtaining target first content information in response to that the to-be-detected short link is included in the at least one short link, the target first content information being first content information corresponding to the to-be-detected short link obtained from the second link release information; and displaying second prompt information in response to the target first content information being inconsistent with content information obtained by accessing the to-be-detected short link, the second prompt information indicating that the to-be-detected short link is an insecure link.

In some embodiments, the second link release information further includes an original link corresponding to any short link generated by the second service provider, the first link release information further includes second content information corresponding to the original link, and the second content information is used for indicating at least one of a page screenshot, a page feature value, or page parameter information corresponding to the original link; and the processor is further configured to perform the following operations: obtaining a target original link in response to that the to-be-detected short link is included in the at least one short link, the target original link being an original link corresponding to the to-be-detected short link obtained from the second link release information; obtaining target second content information, the target second content information being second content information corresponding to the target original link obtained from the first link release information; and displaying third prompt information in response to that the target second content information is inconsistent with content information obtained by accessing the to-be-detected short link, the third prompt information indicating that the to-be-detected short link is an insecure link.

In some embodiments, the second link release information further includes an original link corresponding to any short link generated by the second service provider, the first link release information further includes an account list corresponding to the original link, and the account list is used for indicating at least one account that receives the original link; and the processor is further configured to perform the following operations: obtaining a target original link in response to that the to-be-detected short link is included in the at least one short link, the target original link being an original link corresponding to the to-be-detected short link obtained from the second link release information; obtaining a target account list, the target account list being an account list corresponding to the target original link obtained from the first link release information; and displaying fourth prompt information in response to that an account currently logged in by a terminal is not in the target account list, the fourth prompt information indicating that the to-be-detected short link is an insecure link.

In some embodiments, the processor is further configured to perform the following operations: generating deposit information in response to receiving a deposit instruction, the deposit information indicating information associated with a process of accessing a page corresponding to the to-be-detected short link; and submitting the deposit information.

In some embodiments, the processor is further configured to perform the following operation: transmitting a report request to a forensic device, the report request instructing the forensic device to collect evidence on the to-be-detected short link.

In some embodiments, the processor is further configured to perform the following operations: obtaining a target processing manner corresponding to the target text, the target processing manner including at least one of isolation, deletion, labeling, or display of prompt information; and processing the target text based on the target processing manner.

In some embodiments, the processor is further configured to perform the following operations: performing punctuation detection on the target text; and using, in response to detecting a target punctuation, a field indicated by the target punctuation as the first service provider information.

In some embodiments, the to-be-detected short link is associated with at least one of a text, a picture, a button, or a video in the target text.

In some embodiments, the terminal 800 may include a peripheral interface 803 and at least one peripheral. The processor 801, the memory 802, and the peripheral interface 803 may be connected by a bus or a signal line. Each peripheral device may be connected to the peripheral interface 803 by a bus, a signal line, or a circuit board. Specifically, the peripheral devices include: at least one of a radio frequency (RF) circuit 804, a touch display screen 805, a camera assembly 806, an audio circuit 807, a positioning component 808, and a power supply 809.

The peripheral interface 803 may be configured to connect the at least one peripheral related to input/output (I/O) to the processor 801 and the memory 802. In some embodiments, the processor 801, the memory 802, and the peripheral interface 803 are integrated on the same chip or the same circuit board. In some other embodiments, any or both of the processor 801, the memory 802, and the peripheral interface 803 may be implemented on an independent chip or circuit board, which is not limited in this embodiment.

The RF circuit 804 is configured to receive and transmit an RF signal, also referred to as an electromagnetic signal. The radio frequency circuit 804 communicates with a communication network and other communication devices through the electromagnetic signal. The radio frequency circuit 804 converts an electrical signal into an electromagnetic signal for transmission or converts a received electromagnetic signal into an electrical signal. The RF circuit 804 may include: an antenna system, an RF transceiver, one or more amplifiers, a tuner, an oscillator, a DSP, a codec chip set, and a subscriber identity module card. The RF circuit 804 may communicate with another terminal by using at least one wireless communication protocol. The wireless communication protocol includes, but is not limited to, a metropolitan area network, different generations of mobile communication networks (2G, 3G, 4G, and 5G), a wireless local area network, and/or a wireless fidelity (Wi-Fi) network. In some embodiments, the RF circuit 804 may further include a circuit related to NFC, which is not limited in this disclosure.

The display screen 805 is configured to display a user interface (UI). The UI may include a graph, a text, an icon, a video, and any combination thereof. When the display screen 805 is a touch display screen, the display screen 805 is further capable of collecting touch signals on or above a surface of the display screen 805. The touch signal may be inputted, as a control signal, to the processor 801 for processing. In this case, the display screen 805 may be further configured to provide a virtual button and/or a virtual keyboard, which is also referred to as a soft button and/or a soft keyboard. In some embodiments, the display screen 805 may be one, and a front panel of the terminal 800 is disposed; in other embodiments, there may be at least two display screens 805 that are respectively disposed on different surfaces of the terminal 800 or folded. In still other embodiments, the display screen 805 may be a flexible display screen disposed on a curved surface or a folded surface of the terminal 800. Even, the display screen 805 may also be set to a non-rectangular irregular pattern, that is, a special-shaped screen. The display screen 805 may be made of materials such as a liquid crystal display (LCD), an organic light-emitting diode (OLED), or the like.

The camera assembly 806 is configured to collect images or videos. The camera assembly 806 may include a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any of a main camera, a depth-of-field camera, a wide-angle camera, and a telephoto camera, to achieve backend blurring function through fusion of the main camera and the depth-of-field camera, panoramic photographing and virtual reality (VR) photographing through fusion of the main camera and the wide-angle camera, or other fusion photographing functions. In some embodiments, the camera assembly 806 may further include a flash. The flash may be a monochrome temperature flash or may be a double color temperature flash. The double color temperature flash refers to a combination of a warm light flash and a cold light flash and may be used for light compensation under different color temperatures.

The audio circuit 807 may include a microphone and a loudspeaker. The microphone is configured to acquire sound waves of a user and an environment, and convert the sound waves into electrical signals and input the electrical signals into the processor 801 for processing, or input the electrical signals into the radio frequency circuit 804 to implement voice communication. For a purpose of stereo acquiring or noise reduction, there may be a plurality of microphones disposed at different portions of the terminal 800. The microphone may be further an array microphone or an omnidirectional microphone. The speaker is configured to convert electric signals from the processor 801 or the radio frequency circuit 804 into sound waves. The speaker may be a conventional thin-film speaker or a piezoelectric ceramic speaker. When the speaker is the piezoelectric ceramic speaker, the speaker can not only convert an electric signal into sound waves audible to a human being, but also convert an electric signal into sound waves inaudible to the human being for ranging and other purposes. In some embodiments, the audio circuit 807 may further include an earphone jack.

The positioning component 808 is configured to determine a current geographic location of the terminal 800, to implement navigation or a location-based service (LBS). The positioning component 808 may be a positioning component based on the Global Positioning System (GPS) of the United States, the BeiDou system of China, the GLONASS System of Russia, or the GALILEO System of the European Union.

The power supply 809 is configured to supply power to components in the terminal 800. The power supply 809 may be an alternating-current power supply, a direct-current power supply, a disposable battery, or a rechargeable battery. In a case that the power supply 809 includes the rechargeable battery, the rechargeable battery may support wired charging or wireless charging. The rechargeable battery may be further configured to support a fast charge technology.

In some embodiments, the terminal 800 may further include one or more sensors 810. The one or more sensors 810 include but are not limited to an acceleration sensor 811, a gyroscope sensor 812, a pressure sensor 813, a fingerprint sensor 814, an optical sensor 815, and a proximity sensor 816.

The acceleration sensor 811 may detect the magnitude of acceleration on three coordinate axes of a coordinate system established by the terminal 800. For example, the acceleration sensor 811 may be configured to detect components of gravity acceleration on the three coordinate axes. The processor 801 may control, according to a gravity acceleration signal collected by the acceleration sensor 811, the display screen 805 to display the user interface in a frame view or a portrait view. The acceleration sensor 811 may be further configured to acquire motion data of a game or a user.

The gyroscope sensor 812 may detect a body direction and a rotation angle of the terminal 800 and may work with the acceleration sensor 811 to acquire a 3D action performed by the user on the terminal 800. The processor 801 may implement the following functions according to the data collected by the gyroscope sensor 812: motion sensing (for example, change of the UI based on a tilt operation of the user), image stabilization during photographing, game control, and inertial navigation.

The pressure sensor 813 may be disposed at a side frame of the terminal 800 and/or a lower layer of the display screen 805. When the pressure sensor 813 is disposed at the side frame of the terminal 800, a holding signal of the user on the terminal 800 may be detected, and the processor 801 performs left/right hand identification or a quick operation according to the holding signal collected by the pressure sensor 813. When the pressure sensor 813 is disposed on the low layer of the display screen 805, the processor 801 controls, according to a pressure operation of the user on the display screen 805, an operable control on the UI. The operable control includes at least one of a button control, a scroll-bar control, an icon control, and a menu control.

The fingerprint sensor 814 is configured to collect a user's fingerprint, and the processor 801 identifies a user's identity according to the fingerprint collected by the fingerprint sensor 814, or the fingerprint sensor 814 identifies a user's identity according to the collected fingerprint. When the identity of the user is identified as a trusted identity, the processor 801 authorizes the user to perform related sensitive operations. The sensitive operations may include unlocking a screen, viewing encrypted information, downloading software, paying, changing a setting, and the like. The fingerprint sensor 814 may be disposed on a front surface, a rear surface, or a side surface of the terminal 800. When a physical button or a vendor logo is disposed on the terminal 800, the fingerprint sensor 814 may be integrated with the physical button or the vendor logo.

The optical sensor 815 is configured to acquire ambient light intensity. In an embodiment, the processor 801 may control display luminance of the display screen 805 according to the ambient light intensity collected by the optical sensor 815. Specifically, in a case that the ambient light intensity is relatively high, the display luminance of the display screen 805 is increased; and in a case that the ambient light intensity is relatively low, the display luminance of the touch display screen 805 is reduced. In another embodiment, the processor 801 may further dynamically adjust a camera parameter of the camera assembly 806 according to the ambient light intensity collected by the optical sensor 815.

The proximity sensor 816, also referred to as a distance sensor, is usually disposed on a front panel of the terminal 800. The proximity sensor 816 is configured to collect a distance between a user and the front surface of the terminal 800. In an embodiment, when the proximity sensor 816 detects that the distance between the user and the front surface of the terminal 800 gradually becomes small, the touch display screen 805 is controlled by the processor 801 to switch from a screen-on state to a screen-off state; and when the proximity sensor 816 detects that the distance between the user and the front surface of the terminal 800 gradually increases, the touch display screen 805 is controlled by the processor 801 to switch from the screen-off state to the screen-on state.

A person skilled in the art may understand that the structure shown in FIG. 8 does not constitute a limitation on the terminal 800 and that the terminal may include more or fewer assemblies than those shown in the figure, a combination of some assemblies, or different assembly arrangements.

Figure 9:
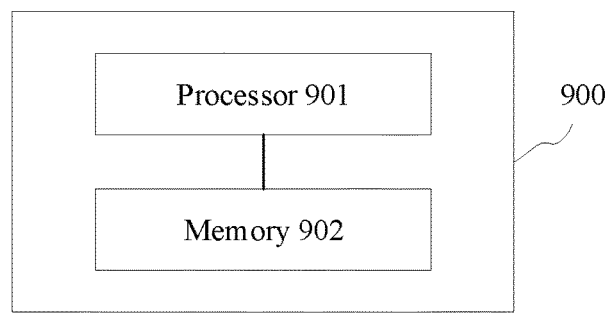
FIG. 9 is a schematic structural diagram of a server according to an embodiment of this disclosure.

The electronic device may be implemented as a server. FIG. 9 is a schematic structural diagram of a server according to an embodiment of this disclosure. The server 900 may vary greatly due to different configurations or performance and may include one or more processors (such as central processing units (CPUs)) 901 and one or more memories 902. The memory 902 stores at least one instruction, the at least one instruction being loaded and executed by the processor 901 to implement the methods provided in the foregoing method embodiments. The server may further include a wired or wireless network interface, a keyboard, an input/output interface and other components to facilitate input/output. The server may also include other components for implementing device functions. Details are not described herein again.

The embodiments of this disclosure further provide a computer-readable storage medium. The computer-readable storage medium is applied to an electronic device, and at least one piece of program code (i.e., computer-readable instructions) is stored in the computer-readable storage medium, the at least one piece of program code being configured to be executed by a processor to implement the following operations: obtaining first service provider information from a target text, the target text including a to-be-detected short link; obtaining at least one short link based on the first service provider information, the short link being a short link that is generated by a second service provider for a first service provider and meets a target condition, the first service provider being a service provider indicated by the first service provider information, the second service provider being configured to provide a short link generation service; and determining, in response to that the to-be-detected short link is not included in the at least one short link, that the to-be-detected short link is an insecure link.

In some embodiments, the processor is further configured to perform the following operations: obtaining second service provider information associated with the first service provider information based on the first service provider information; and obtaining at least one short link from a short link associated with the second service provider information based on the second service provider information.

In some embodiments, the processor is further configured to perform the following operations: determining a first block from a blockchain system based on the first service provider information, the first block storing first link release information of the first service provider; and obtaining the second service provider information from the first link release information of the first service provider stored in the first block.

In some embodiments, the processor is further configured to perform the following operations: determining a second block from a blockchain system based on the second service provider information, the second block storing second link release information of the second service provider; and obtaining the at least one short link from the second link release information of the second service provider stored in the second block.

In some embodiments, the target condition is at least one of the following: a short link generation time being within a target time period; the short link being not expired; and a service type to which the short link belongs being consistent with a target service type indicated by the target text.

In some embodiments, the processor is further configured to perform the following operations: determining the target time period according to a receiving time of the target text; and filtering a plurality of short links included in the second link release information of the second service provider stored in the second block to obtain the at least one short link.

In some embodiments, the second link release information further includes a service type corresponding to any short link generated by the second service provider, one short link corresponding to one service type; and the processor is further configured to perform the following operations: performing content identification on the target text to determine a target service type corresponding to the to-be-detected short link; and obtaining at least one short link belonging to the target service type from the second link release information of the second service provider stored in the second block.

In some embodiments, the second link release information further includes time limit information corresponding to any short link generated by the second service provider, and the time limit information is used for indicating whether the short link is expired; and the processor is further configured to perform the following operations: obtaining at least one piece of time limit information from the second link release information of the second service provider stored in the second block; and obtaining at least one unexpired short link from the second link release information based on the at least one piece of time limit information.

In some embodiments, the second link release information further includes time limit information corresponding to any short link generated by the second service provider, and the time limit information is used for indicating whether the short link is expired; and the processor is further configured to perform the following operations: obtaining target time limit information in response to that the to-be-detected short link is included in the at least one short link, the target time limit information being time limit information corresponding to the to-be-detected short link obtained from the second link release information; and displaying first prompt information in response to the target time limit information indicating that the to-be-detected short link is expired, the first prompt information prompting that the to-be-detected short link is expired.

In some embodiments, the second link release information further includes first content information corresponding to any short link generated by the second service provider, and the first content information is used for indicating at least one of a page screenshot, a page feature value, or page parameter information corresponding to the short link; and the processor is further configured to perform the following operations: obtaining target first content information in response to that the to-be-detected short link is included in the at least one short link, the target first content information being first content information corresponding to the to-be-detected short link obtained from the second link release information; and displaying second prompt information in response to the target first content information being inconsistent with content information obtained by accessing the to-be-detected short link, the second prompt information indicating that the to-be-detected short link is an insecure link.

In some embodiments, the second link release information further includes an original link corresponding to any short link generated by the second service provider, the first link release information further includes second content information corresponding to the original link, and the second content information is used for indicating at least one of a page screenshot, a page feature value, or page parameter information corresponding to the original link; and the processor is further configured to perform the following operations: obtaining a target original link in response to that the to-be-detected short link is included in the at least one short link, the target original link being an original link corresponding to the to-be-detected short link obtained from the second link release information; obtaining target second content information, the target second content information being second content information corresponding to the target original link obtained from the first link release information; and displaying third prompt information in response to that the target second content information is inconsistent with content information obtained by accessing the to-be-detected short link, the third prompt information indicating that the to-be-detected short link is an insecure link.

In some embodiments, the second link release information further includes an original link corresponding to any short link generated by the second service provider, the first link release information further includes an account list corresponding to the original link, and the account list is used for indicating at least one account that receives the original link; and the processor is further configured to perform the following operations: obtaining a target original link in response to that the to-be-detected short link is included in the at least one short link, the target original link being an original link corresponding to the to-be-detected short link obtained from the second link release information; obtaining a target account list, the target account list being an account list corresponding to the target original link obtained from the first link release information; and displaying fourth prompt information in response to that an account currently logged in by a terminal is not in the target account list, the fourth prompt information indicating that the to-be-detected short link is an insecure link.

In some embodiments, the processor is further configured to perform the following operations: generating deposit information in response to receiving a deposit instruction, the deposit information indicating information associated with a process of accessing a page corresponding to the to-be-detected short link; and submitting the deposit information.

In some embodiments, the processor is further configured to perform the following operation: transmitting a report request to a forensic device, the report request instructing the forensic device to collect evidence on the to-be-detected short link.

In some embodiments, the processor is further configured to perform the following operations: obtaining a target processing manner corresponding to the target text, the target processing manner including at least one of isolation, deletion, labeling, or display of prompt information; and processing the target text based on the target processing manner.

In some embodiments, the processor is further configured to perform the following operations: performing punctuation detection on the target text; and using, in response to detecting a target punctuation, a field indicated by the target punctuation as the first service provider information.

In some embodiments, the to-be-detected short link is associated with at least one of a text, a picture, a button, or a video in the target text.

A person of ordinary skill in the art may understand that all or some of the steps of the foregoing embodiments may be implemented by hardware or may be implemented by a program instructing relevant hardware. The program may be stored in a computer-readable storage medium. The storage medium may be a read-only memory, a magnetic disk, an optical disc, or the like.

The foregoing descriptions are merely exemplary embodiments of this disclosure but are not intended to limit this disclosure. Any modification, equivalent replacement, or improvement made within the spirit and principle of this disclosure shall fall within the scope of this disclosure.

What is claimed is:

1. A link detection method comprising:
    obtaining, by processing circuitry of an electronic device, first service provider information from a target text, the target text including the first service provider information and a short link;
    obtaining at least one reference short link based on the first service provider information, the at least one reference short link being at least one short link that is generated by a second service provider for a first service provider and meets a target condition, the first service provider being a service provider indicated by the first service provider information, the second service provider being configured to provide a short link generation service; and
    determining, in response to a determination that the short link is not included in the obtained at least one reference short link, that the short link is insecure.

2. The method according to claim 1, wherein the obtaining the at least one reference short link comprises:
    obtaining second service provider information associated with the first service provider information; and
    obtaining the at least one reference short link from a second short link associated with the second service provider information.

3. The method according to claim 2, wherein the obtaining the second service provider information comprises:
    determining a first block from a blockchain system based on the first service provider information, the first block storing first link release information of the first service provider; and
    obtaining the second service provider information from the first link release information of the first service provider stored in the first block.

4. The method according to claim 3, wherein the obtaining the at least one reference short link from the second short link associated with the second service provider information comprises:
    determining a second block from the blockchain system based on the second service provider information, the second block storing second link release information of the second service provider; and
    obtaining the at least one reference short link from the second link release information of the second service provider stored in the second block.

5. The method according to claim 4, wherein the target condition is at least one of:
    a short link generation time of the at least one reference short link being within a target time period;
    the at least one reference short link being not expired; or
    a service type to which the at least one reference short link belongs being consistent with a target service type indicated by the target text.

6. The method according to claim 5, wherein the obtaining the at least one reference short link from the second link release information comprises:
    determining the target time period according to a receiving time of the target text; and
    filtering a plurality of short links included in the second link release information of the second service provider stored in the second block to obtain the at least one reference short link.

7. The method according to claim 5, wherein
the second link release information further includes a service type corresponding to short links generated by the second service provider, wherein each short link corresponds to one service type; and
the obtaining the at least one reference short link from the second link release information includes:
  performing content identification on the target text to determine the target service type; and
  obtaining the at least one reference short link belonging to the target service type from the second link release information of the second service provider stored in the second block.

8. The method according to claim 5, wherein
the second link release information further includes time limit information corresponding to short links generated by the second service provider, and the time limit information indicating whether a corresponding short link is expired; and
the obtaining the at least one reference short link from the second link release information includes:
  obtaining at least one piece of the time limit information from the second link release information of the second service provider stored in the second block; and
  obtaining at least one unexpired short link from the second link release information as the at least one reference short link based on the obtained at least one piece of the time limit information.

9. The method according to claim 4, wherein
the second link release information further includes time limit information corresponding to short links generated by the second service provider, and the time limit information indicating whether a corresponding short link is expired; and
the method further comprises:
  obtaining the time limit information in response to a determination that the short link is included in the obtained at least one reference short link, the time limit information being obtained from the second link release information and corresponding to the short link; and
  displaying first prompt information in response to the time limit information indicating that the short link is expired, the first prompt information prompting that the short link is expired.

10. The method according to claim 4, wherein
the second link release information further includes first content information corresponding to short links generated by the second service provider, and the first content information indicating at least one of a page screenshot, a page feature value, or page parameter information corresponding to a corresponding short link; and
the method further comprises:
  obtaining the first content information in response to a determination that the short link is included in the obtained at least one reference short link, the first content information being obtained from the second link release information and corresponding to the short link; and
  displaying second prompt information in response to the first content information being inconsistent with content information obtained by accessing the short link, the second prompt information indicating that the short link is insecure.

11. The method according to claim 4, wherein
the second link release information further includes an original link corresponding to a short link generated by the second service provider, the first link release information further includes second content information corresponding to the original link, and the second content information indicating at least one of a page screenshot, a page feature value, or page parameter information corresponding to the original link; and
the method further comprises:
  obtaining the original link in response to a determination that the short link is included in the obtained at least one reference short link, the original link being obtained from the second link release information and corresponding to the short link;
  obtaining the second content information, the second content information being obtained from the first link release information and corresponding to the original link; and
  displaying third prompt information in response to a determination that the second content information is inconsistent with content information obtained by accessing the short link, the third prompt information indicating that the short link is insecure.

12. The method according to claim 4, wherein
the second link release information further includes an original link corresponding to a short link generated by the second service provider, the first link release information further includes an account list corresponding to the original link, and the account list indicating at least one account that receives the original link; and
the method further comprises:
  obtaining the original link in response to a determination that the short link is included in the obtained at least one reference short link, the original link being obtained from the second link release information and corresponding to the short link;
  obtaining the account list, the account list being obtained from the first link release information and corresponding to the original link; and
  displaying fourth prompt information in response to a determination that an account currently logged into by a terminal is not in the account list, the fourth prompt information indicating that the short link is insecure.

13. The method according to claim 1, wherein the method further comprises:
  generating deposit information in response to receiving a deposit instruction, the deposit information indicating information associated with a process of accessing a page corresponding to the short link; and
  submitting the deposit information.

14. The method according to claim 13, wherein, after the receiving the deposit instruction, the method further comprises:
  transmitting a report request to a forensic device, the report request instructing the forensic device to collect evidence on the short link.

15. The method according to claim 1, wherein the method further comprises:
  obtaining a processing manner corresponding to the target text, the processing manner comprising at least one of isolation, deletion, labeling, or display of prompt information; and
  processing the target text based on the processing manner.

16. The method according to claim 1, wherein the obtaining the first service provider information from the target text comprises:
performing punctuation detection on the target text; and
using, in response to detecting a target punctuation, a field indicated by the target punctuation as the first service provider information.

17. The method according to claim 1, wherein the short link is associated with at least one of a text, a picture, a button, or a video in the target text.

18. A link detection apparatus comprising:
processing circuitry configured to
obtain first service provider information from a target text, the target text including the first service provider information and a short link,
obtain at least one reference short link based on the first service provider information, the at least one reference short link being at least one short link that is generated by a second service provider for a first service provider and meets a target condition, the first service provider being a service provider indicated by the first service provider information, the second service provider being configured to provide a short link generation service; and
determine, in response to a determination that the short link is not included in the obtained at least one reference short link, that the short link is insecure.

19. The link detection apparatus according to claim 18, wherein the processing circuitry is further configured to
obtain second service provider information associated with the first service provider information; and
obtain the at least one reference short link from a second short link associated with the second service provider information.

20. A non-transitory computer-readable storage medium storing computer-readable instructions thereon, which, when executed by a processor, cause the processor to perform:
obtaining first service provider information from a target text, the target text including the first service provider information and a short link;
obtaining at least one reference short link based on the first service provider information, the at least one reference short link being at least one short link that is generated by a second service provider for a first service provider and meets a target condition, the first service provider being a service provider indicated by the first service provider information, the second service provider being configured to provide a short link generation service; and
determining, in response to a determination that the short link is not included in the obtained at least one reference short link, that the short link is insecure.

* * * * *